(12) United States Patent
Matton et al.

(10) Patent No.: US 12,182,102 B1
(45) Date of Patent: Dec. 31, 2024

(54) LINKING KEY-VALUE PAIRS IN DOCUMENTS

(71) Applicant: Scale AI, Inc., San Francisco, CA (US)

(72) Inventors: Alexandre Matton, San Francisco, CA (US); Chiao-Lun Cheng, San Francisco, CA (US); Adrian Yunpfei Lam, South San Francisco, CA (US)

(73) Assignee: Scale AI, Inc., San Francisco, CA (US)

( * ) Notice: Subject to any disclaimer, the term of this patent is extended or adjusted under 35 U.S.C. 154(b) by 651 days.

(21) Appl. No.: 17/405,141

(22) Filed: Aug. 18, 2021

(51) Int. Cl.
| | | |
|---|---|---|
| *G06F 16/23* | (2019.01) | |
| *G06V 10/30* | (2022.01) | |
| *G06V 30/10* | (2022.01) | |
| *G06V 30/14* | (2022.01) | |
| *G06V 30/414* | (2022.01) | |

(52) U.S. Cl.
CPC .......... *G06F 16/2379* (2019.01); *G06V 10/30* (2022.01); *G06V 30/10* (2022.01); *G06V 30/141* (2022.01); *G06V 30/414* (2022.01)

(58) Field of Classification Search
None
See application file for complete search history.

(56) References Cited

U.S. PATENT DOCUMENTS

| | | | | |
|---|---|---|---|---|
| 10,445,569 B1 * | 10/2019 | Lin | .................... | G06T 7/0004 |
| 10,839,245 B1 * | 11/2020 | Dhillon | ................ | G06F 18/217 |
| 10,896,357 B1 | 1/2021 | Corcoran et al. | | |
| 10,915,788 B2 * | 2/2021 | Hoehne | ................... | G06N 3/045 |
| 11,182,604 B1 * | 11/2021 | Methaniya | ........... | G06V 30/412 |
| 11,810,380 B2 * | 11/2023 | Arroyo | .................. | G06N 3/045 |
| 2020/0159820 A1 * | 5/2020 | Rodriguez | ........... | G06F 40/137 |
| 2020/0160050 A1 * | 5/2020 | Bhotika | .............. | G06V 30/414 |
| 2021/0073533 A1 | 3/2021 | Ast | | |
| 2021/0383106 A1 | 12/2021 | Maggio et al. | | |
| 2022/0036063 A1 | 2/2022 | Bhuyan et al. | | |
| 2022/0300834 A1 * | 9/2022 | Zeng | ..................... | G06F 40/284 |

OTHER PUBLICATIONS

Liao et al., "Real-time Scene Text Detection with Differentiable Binarization", trainarXiv: 1911.08947v2 [cs.CV] Dec. 3, 2019, 8 pages.

(Continued)

*Primary Examiner* — Scott A. Waldron
(74) *Attorney, Agent, or Firm* — Squire Patton Boggs LLP; Sarah Mirza

(57) ABSTRACT

One embodiment of the present invention sets forth a technique for extracting data from a document. The technique includes determining, via execution of one or more machine learning models, a first set of bounding boxes for a first set of values associated with a first key within the document and a second set of bounding boxes for a second set of values associated with a second key within the document. The technique also includes generating a first set of mappings between a list of items in the document and the first set of bounding boxes and a second set of mappings between the first and second sets of bounding boxes based on locations of the bounding boxes. The technique further includes determining, for a given item, one or more associated bounding boxes in the first and second sets of bounding boxes based on the mappings.

20 Claims, 14 Drawing Sheets

(56) References Cited

OTHER PUBLICATIONS

Amazon Textract Developer Guide, https://docs.aws.amazon.com/textract/latest/dg/textract-dg.pdf, 240 pages.
Non Final Office Action received for U.S. Appl. No. 17/405,127 dated Nov. 27, 2023, 28 pages.
Non-Final Office Action received for U.S. Appl. No. 17/405,127 dated May 14, 2024, 24 pages.
Notice of Allowance received for U.S. Appl. No. 17/405,127 dated Sep. 30, 2024, 14 pages.

* cited by examiner

From: — 502
John Smith
123 Main St.
New York, NY

To: — 504
Jane Doe
456 1st St.
New York, NY

Invoice No.: 001 — 506
Invoice Date: June 15, 2021 — 508
Due: July 31, 2021 — 510

| Description | Quantity | Rate | Subtotal |
|---|---|---|---|
| Web hosting package | 1 | $80 | $80 |
| Website design | 2 | $2,000 | $2,000 |
| www.example.com | | | |
| www.acmeco.com | | | |

— 512, 514, 516, 518

Total $2,080 — 520

FIG. 5A

LINKING KEY-VALUE PAIRS IN DOCUMENTS

BACKGROUND

Field of the Various Embodiments

Embodiments of the present disclosure relate generally to machine learning and data extraction and, more specifically, to linking key-value pairs in documents.

Description of the Related Art

Despite the proliferation of computer- and web-based technologies, documents are still used by many industries to record, exchange, and/or process data. For example, physical and/or electronic documents may be used to conduct operations related to logistics, manufacturing, shipping, finance, healthcare, law, and/or other domains.

Because documents can vary in layout, content, and appearance, techniques for extracting data from the documents commonly involve significant manual work and overhead. For example, a company may use a team of people to manually enter data from the documents into a database and/or another type of digital system. Within the digital system, the data may be organized into a structured format that allows individual data elements to be semantically interpreted and/or related. However, this manual data entry is tedious, slow, difficult to scale, subject to human error, and resource-intensive (as each person performing data entry at a given moment requires the use of a different computer).

A number of computer-based tools have been developed to reduce time and effort associated with manually extracting data from documents. However, these computer-based tools require human input to be adapted to different document layouts. For example, an optical character recognition (OCR) tool can be used to extract text from documents without understanding the content of the text. To provide semantic context for text extracted from a given document layout, a user can create a set of extraction rules and/or an automated workflow to convert the text into structured data. However, this set of extraction rules and/or automated workflow cannot be used with documents that adhere to other layouts. Instead, the user would need to create a new set of extraction rules and/or a new automated workflow to convert text associated with each document layout into structured data.

Other approaches utilize machine learning techniques to predict semantic relationships associated with text in documents. However, these approaches tend to emphasize the content and ordering of text in the documents instead of the location and/or appearance of the text within the documents. For example, a machine learning model can be trained to predict bounding boxes for individual data elements (e.g., form fields) in a document, based on inputs such as an image of the document, a sequence of text in the document, and/or bounding boxes for words in the document. After the machine learning model is trained, the machine learning model may learn to identify data elements in documents based on the content and ordering of words in the documents and/or the overall structure of the documents. Thus, while the machine learning model may perform well with documents that have similar content or structure to the documents in the training dataset for the machine learning model, the machine learning model may fail to recognize data elements in documents that have dissimilar content or structure to those in the training dataset.

As the foregoing illustrates, what is needed in the art are more effective techniques for identifying and extracting data elements in documents.

SUMMARY

One embodiment of the present invention sets forth a technique for extracting data from a document. The technique includes determining, via execution of one or more machine learning models, a first set of bounding boxes for a first set of values associated with a first key within the document and a second set of bounding boxes for a second set of values associated with a second key within the document. The technique also includes generating a first set of mappings between a list of items in the document and the first set of bounding boxes and a second set of mappings between the first and second sets of bounding boxes based on locations of the bounding boxes. The technique further includes determining, for a given item, one or more associated bounding boxes in the first and second sets of bounding boxes based on the mappings.

One technical advantage of the disclosed techniques relative to the prior art is that key-value pairs are extracted from documents and linked without requiring user input or review. Thus, the disclosed techniques can be used to extract and link data elements and the associated semantic context from documents in a more efficient and less resource-intensive manner than conventional approaches that involve manual data entry and/or user configuration of data extraction rules or workflows. Another advantage of the disclosed techniques is more accurate extraction and linking of keys and/or values from documents that vary in structure or content, compared with conventional machine learning approaches that identify data elements in documents based on the content and ordering of words in the documents and/or the overall structure of the documents. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 5A illustrates an exemplar extraction of key-value pairs from a document, according to various embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
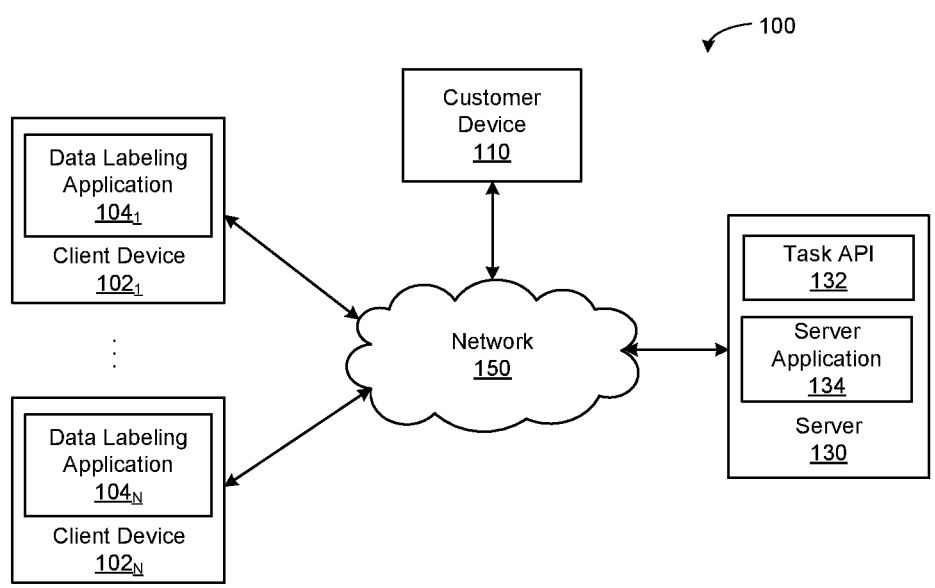
FIG. 1 is a conceptual illustration of a system configured to implement one or more embodiments.

FIG. 1 illustrates a system 100 configured to implement one or more aspects of the present disclosure. As shown, system 100 includes, without limitation, a server 130 (also referred to herein as "server 130") and a number of client devices $102_{1-N}$, each of which is referred to individually herein as a client device 102. Server 130 and client devices $102_{1-N}$ interoperate to facilitate data labeling by users of client devices $102_{1-N}$ in response to a customer request. Server 130, client devices $102_{1-N}$, and a customer device 110 communicate via a network 150, which may be a wide area network (WAN) such as the Internet, a local area network (LAN), or any other suitable network. Although a single server 130 and customer device 110 are shown for illustrative purposes, system 100 may generally include any number of servers, customer devices, and client devices, each of which may be a physical computing system or a virtual computing system running in, e.g., a data center or cloud.

Illustratively, server 130 exposes a task application programming interface (API) 132 that allows customers to send data and data labeling requests, via API calls. Any suitable data and labeling requests may be transmitted via such API calls to server 130. For example, in the context of autonomous vehicles, photographic, LIDAR (light detection and ranging), and/or radar (radio detection and ranging) data captured by vehicle-mounted sensors may be uploaded from customer device 110 to the server 130, along with a request that particular types of objects (e.g., vehicles, bicycles, pedestrians, etc.) be tagged in such data. GPS (global positioning system) data may also be uploaded and may be included in LIDAR data.

In some embodiments, a server application 134 executing on server 130 requires the data and data labeling requests submitted via API calls to satisfy predefined restrictions. For example, restrictions may exist on which classes (e.g., vehicles, pedestrians, buildings, etc.) of objects can be labeled, the format and size of the data, etc.

Server application 134 processes data received via task API 132 and sends the processed data to data labeling applications $104_{1-N}$ running in client devices $102_{1-N}$, along with indications of data labeling tasks to be performed by users of client devices $102_{1-N}$, based on the customer's request. Any suitable processing of received data may be performed by server application 134. For example, in some embodiments, server application 134 could convert photographic, LIDAR, or radar data received in different formats to a single format that data labeling applications $104_{1-N}$ can read and process. In another example, server application 134 could compress the received data to a smaller size. Although server application 134 is shown as a single application for illustrative purposes, it should be understood that the functionality of server application 134 may be performed by multiple applications or other types of software in alternative embodiments.

Each of data labeling applications $104_{1-N}$, referred to individually herein as a data labeling application 104, digests and renders data received from server application 134 for display via a user interface (UI). In some embodiments, data labeling application 104 may render one or more colored point clouds for visualizing three-dimensional (3D) data (e.g., LIDAR and/or radar data), while permitting users to navigate and view the point clouds from different perspectives. For example, in some embodiments, data labeling application 104 may use down sampling to obtain an aggregated point cloud that includes only points conveying the most information. In another example, data labeling application 104 could, based on a user specification, blend point cloud colorings derived from different data sources (e.g., photographic, label, and/or LIDAR intensity data). In addition to displaying rendered point clouds via a UI, data labeling application 104 may also display photographs associated with those point clouds at the same time.

In some embodiments, data labeling application 104 provides tools to facilitate data labeling tasks. For example, the tools could allow a user to draw annotations in the form of cuboids or bounding boxes, label points as belonging to particular objects, etc. using a mouse and/or keyboard. As additional examples, tools could be provided that automatically adjust the position and/or orientation of a user-designated cuboid, propagate a user-designated cuboid from a key frame to other frames, etc., thereby aiding the user in performing data labeling tasks.

Figure 2:
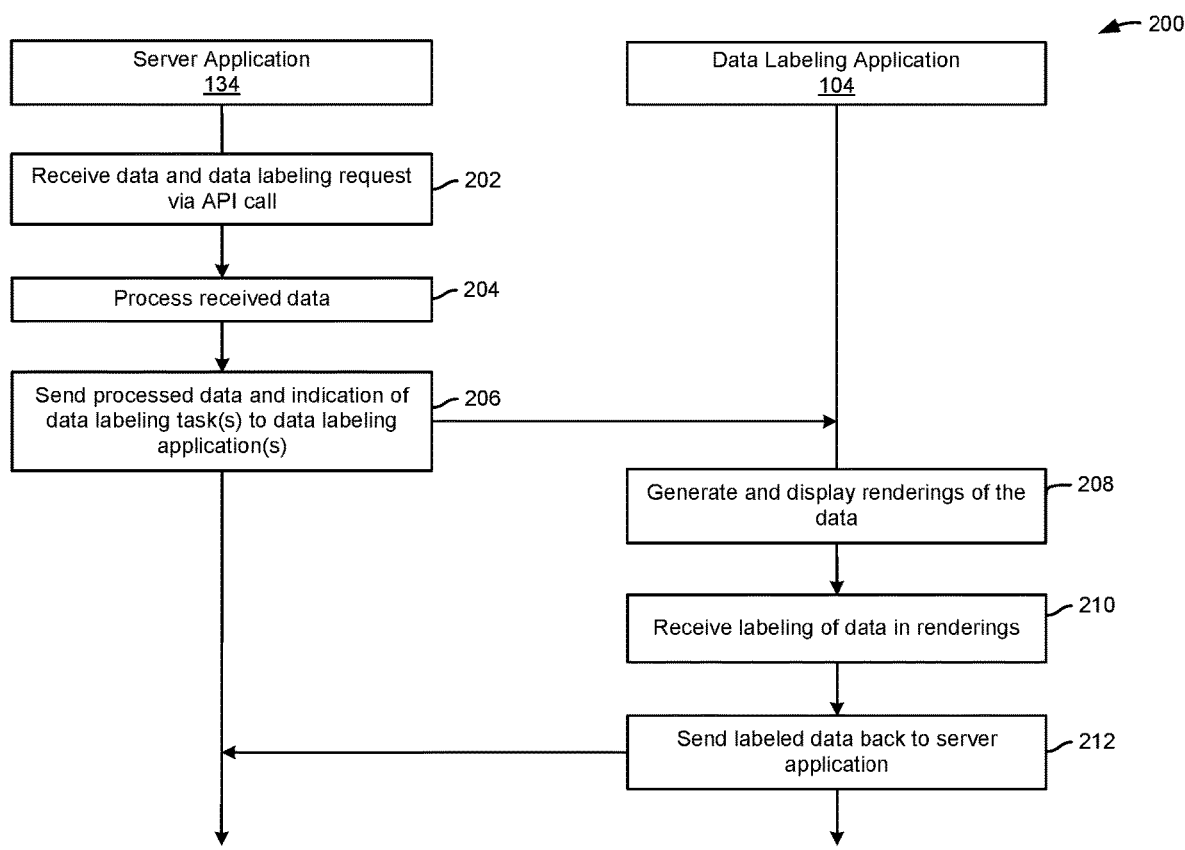
FIG. 2 is a flow diagram of method steps for processing data labeling requests, according to various embodiments.

FIG. 2 is a flow diagram of method steps for processing data labeling requests, according to various embodiments. Although the method steps are described with reference to the system of FIG. 1, persons skilled in the art will understand that any system may be configured to implement the method steps, in any order, in other embodiments.

As shown, a method 200 begins at step 202, where server application 134 receives data and a corresponding data labeling request via an API call. The data may be in any suitable format acceptable to server application 134. For example, server application 134 may need data to be sent in one or more JavaScript Object Notation (JSON) files. Similarly, the data labeling request may need to satisfy certain restrictions, such as which classes (e.g., vehicles, pedestrians, buildings, etc.) of objects can be labeled.

At step 204, server application 134 processes the received data. Any suitable processing may be performed by server application 134. In some embodiments, the processing may include compressing the received data and/or converting the received data into a format that can be read by data labeling application(s). For example, the received data could be converted to a data format in which points of a 3D point cloud are represented in a list as (x, y, z) coordinates with associated time stamps.

At step 206, server application 134 sends the processed data and an indication of data labeling task(s), based on the received request, to one or more data labeling applications. Although one data labeling application 104 is shown for illustrative purposes, it should be understood that server application 134 may send the processed data and indication of data labeling task(s), via a network, to any number of data labeling applications running on different client devices.

At step 208, a data labeling application 104 generates and displays renderings of the received data. For example, data labeling application 104 may display rendered point cloud(s) via a UI that permits a user to navigate and view the point cloud(s) from different perspectives. The UI may also, or instead, display text and/or images, and data labeling application 104 may provide tools to facilitate labeling of the rendered point cloud(s), text, images, and/or other data via the UI.

At step 210, data labeling application 104 receives labeling of data in the renderings. For example, the user could look around a two-dimensional (2D) or 3D scene, identify objects of interest, use a mouse to indicate where those objects are located, use the mouse and a keyboard to precisely size cuboids or bounding boxes around the objects, etc. In such a case, the user may further navigate forward and/or backwards in time to see where the objects move over time, and label the objects in every frame that is associated with a distinct point in time. As described, data labeling application 104 may provide tools that enable such labeling, as well as tools that facilitate user labeling by, e.g., automatically adjusting the position and/or orientation of a user-designated cuboid, propagating a cuboid from one frame designated as a key frame to other frames, etc.

At step 212, data labeling application 104 sends the labeled data back to server application 134. The labeled data may be sent to server application 134 via a network, such as the Internet, and server application 134 may then return the labeled data to the customer. In some embodiments, optional verification and/or other processing may be performed prior to returning labeled data to the customer.

Figure 3:
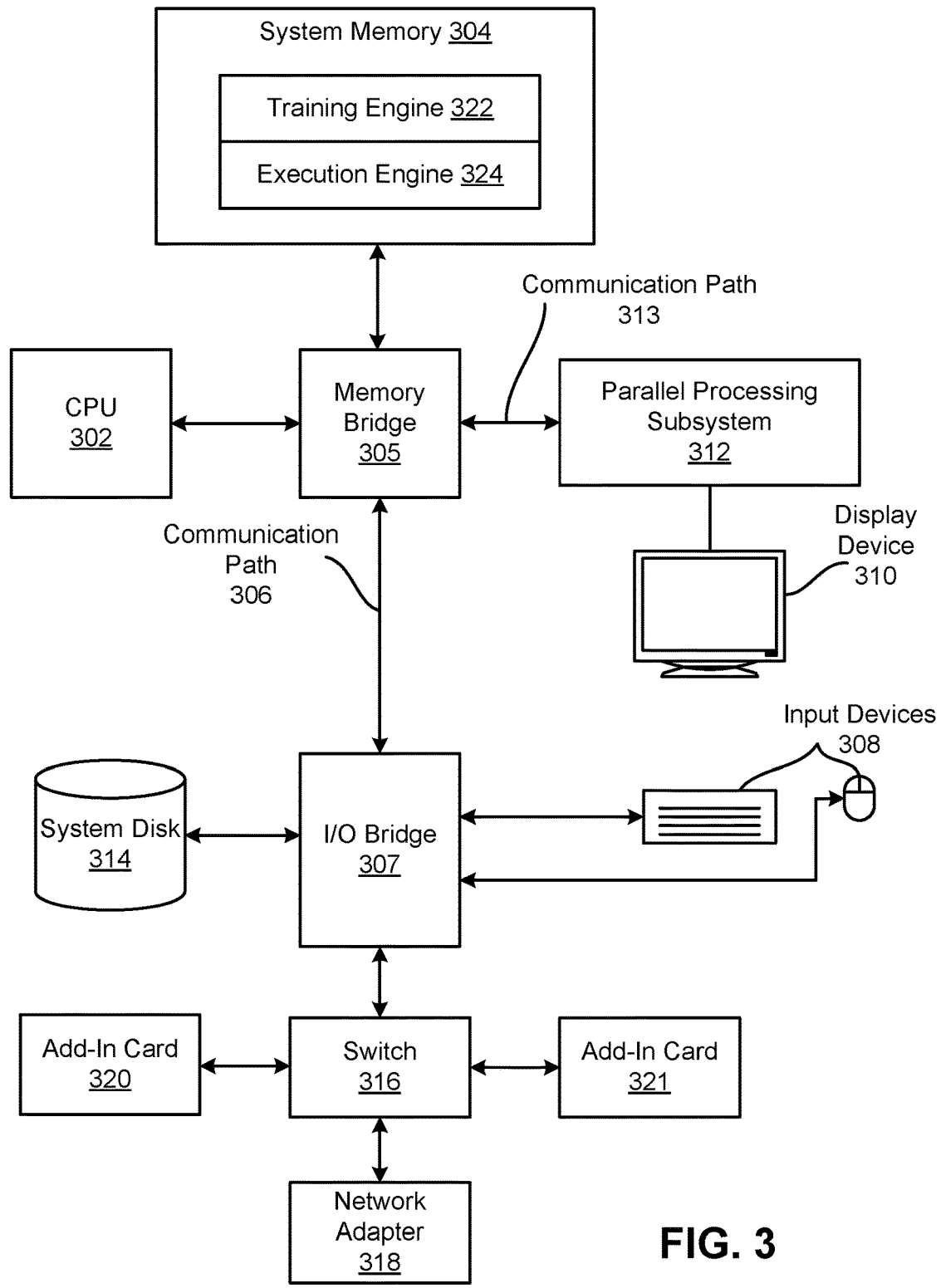
FIG. 3 is a more detailed illustration of the server device of FIG. 1, according to various embodiments.

FIG. 3 is a more detailed illustration of server 130 of FIG. 1, according to various embodiments. It is noted that server 130 described herein is illustrative and that any other technically feasible configurations fall within the scope of the present invention. For example, the hardware and/or software components of server 130 may be implemented on client device 102 and/or customer device 110. In another example, multiple instances of server 130 may execute on a set of nodes in a data center, cluster, or cloud computing environment to implement the functionality of server 130.

As shown, server 130 includes, without limitation, a central processing unit (CPU) 302 and a system memory 304 coupled to a parallel processing subsystem 312 via a memory bridge 305 and a communication path 313. Memory bridge 304 is further coupled to an I/O (input/output) bridge 307 via a communication path 306, and I/O bridge 307 is, in turn, coupled to a switch 316.

In operation, I/O bridge 307 is configured to receive user input information from input devices 308, such as a keyboard or a mouse, and forward the input information to CPU 302 for processing via communication path 306 and memory bridge 305. Switch 316 is configured to provide connections between I/O bridge 307 and other components of server 130, such as a network adapter 318 and various add-in cards 320 and 321.

I/O bridge 307 is coupled to a system disk 314 that may be configured to store content, applications, and data for use by CPU 302 and parallel processing subsystem 312. As a general matter, system disk 314 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 307 as well.

In various embodiments, memory bridge 305 may be a Northbridge chip, and I/O bridge 307 may be a Southbridge chip. In addition, communication paths 306 and 313, as well as other communication paths within server 130, may be implemented using any technically suitable protocols, including, without limitation, AGP (Accelerated Graphics Port), HyperTransport, or any other bus or point-to-point communication protocol known in the art.

In some embodiments, parallel processing subsystem 312 includes a graphics subsystem that delivers pixels to a display device 310 that may be any conventional cathode ray tube, liquid crystal display, light-emitting diode display, or the like. In such embodiments, parallel processing subsystem 312 incorporates circuitry optimized for graphics and video processing, including, for example, video output circuitry. Such circuitry may be incorporated across one or more parallel processing units (PPUs) included within parallel processing subsystem 312. In other embodiments, parallel processing subsystem 312 incorporates circuitry optimized for general purpose and/or compute processing. Again, such circuitry may be incorporated across one or more PPUs included within parallel processing subsystem 312 that are configured to perform such general purpose and/or compute operations. In yet other embodiments, the one or more PPUs included within parallel processing subsystem 312 may be configured to perform graphics processing, general purpose processing, and compute processing operations. System memory 304 includes at least one device driver configured to manage the processing operations of the one or more PPUs within parallel processing subsystem 312.

Parallel processing subsystem 312 may be integrated with one or more of the other elements of FIG. 3 to form a single system. For example, parallel processing subsystem 312 may be integrated with a CPU 302 and other connection circuitry on a single chip to form a system on chip (SoC).

In one embodiment, CPU 302 is the master processor of server 130, controlling and coordinating operations of other system components. In one embodiment, CPU 302 issues commands that control the operation of PPUs. In some embodiments, communication path 313 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, system memory 304 could be connected to CPU 302 directly rather than through memory bridge 305, and other devices would communicate with system memory 304 via memory bridge 305 and CPU 302. In other alternative topologies, parallel processing subsystem 312 may be connected to I/O bridge 307 or directly to CPU 302, rather than to memory bridge 305. In still other embodiments, I/O bridge 307 and memory bridge 305 may be integrated into a single chip instead of existing as one or more discrete devices. Lastly, in certain embodiments, one or more components shown in FIG. 3 may not be present. For example, switch 316 could be eliminated, and network adapter 318 and add-in cards 320, 321 would connect directly to I/O bridge 307.

In one or more embodiments, server 130 is configured to execute a training engine 322 and an execution engine 324 that reside in system memory 304. Training engine 322 and execution engine 324 may be stored in system disk 314 and/or other storage and loaded into system memory 304 when executed.

More specifically, training engine 322 includes functionality to train one or more machine learning models to detect key-value pairs in documents, and execution engine 324 includes functionality to execute the machine learning model(s) to extract key-value pairs from additional documents. As described in further detail below, this model-based key-value extraction can be performed in a way that is independent of the content of the documents and/or the overall structure of the documents. Consequently, training engine 322 and execution engine 324 may extract data elements from documents more efficiently than manual data entry and/or via user-created extraction rules or automated workflows and more accurately than machine learning techniques that extract data from documents based on the content of the documents and/or structural cues within the documents.

Key-Value Extraction from Documents

Figure 4:
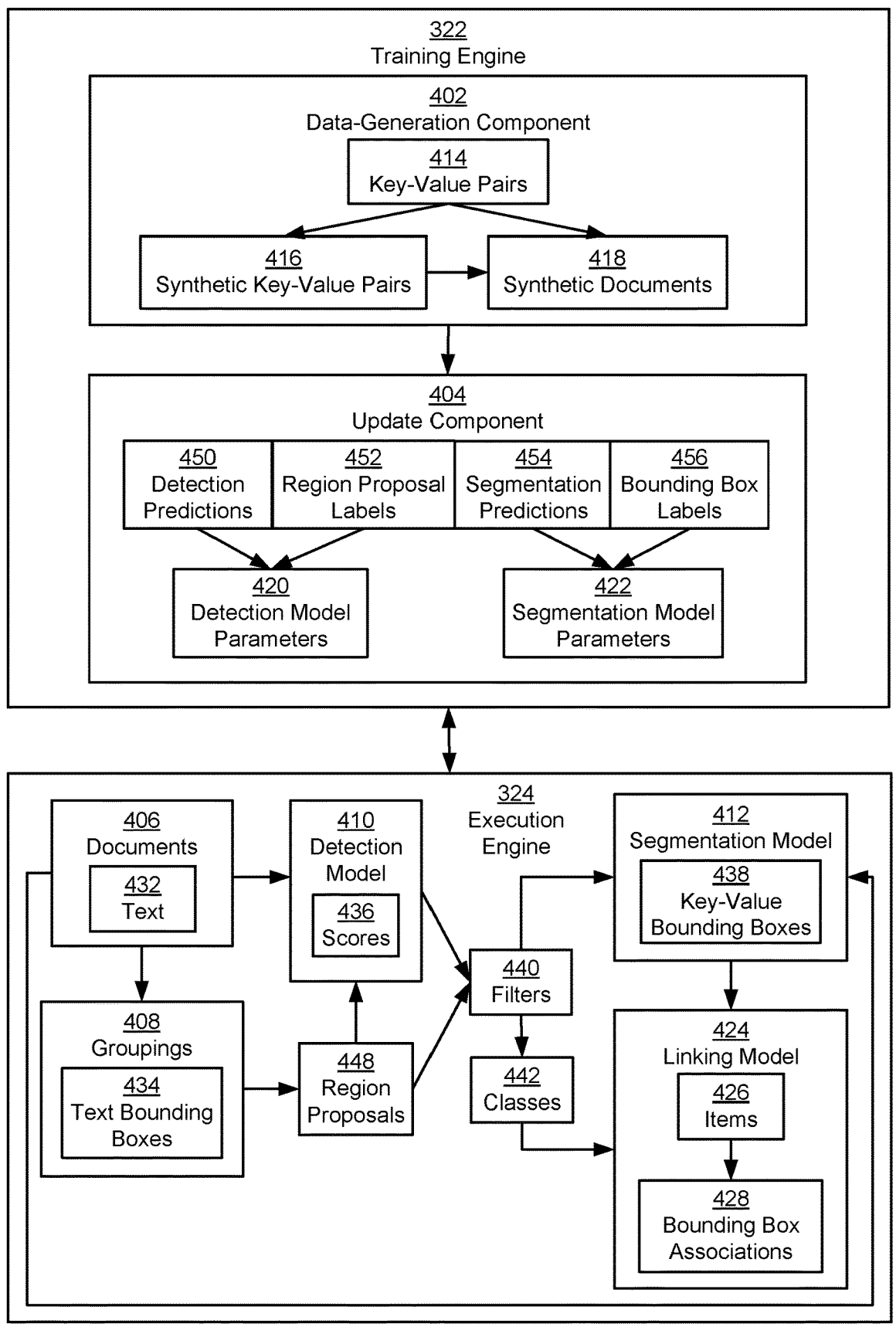
FIG. 4 is a more detailed illustration of the training engine and execution engine of FIG. 3, according to various embodiments.

FIG. 4 is a more detailed illustration of training engine 322 and execution engine 324 of FIG. 3, according to various embodiments. As mentioned above, training engine 322 and execution engine 324 operate to train and execute one or more machine learning models that extract data from one or more documents 406.

In one or more embodiments, data elements extracted from documents 406 include key-value pairs (e.g., key-value pairs 414). The key in each key-value pair identifies a type of data element within a document, and the value in each key-value pair stores a text value that is linked to the corresponding key within a document. For example, the key in a key-value pair may be extracted from the header of a form field, section, or sub-section of a document, and the value in the key-value pair may be extracted from the form field, section, or sub-section. Thus, keys extracted from a bill of lading could include (but are not limited to) "ship from," "ship to," "bill of lading number," "carrier name," "special instructions," "customer order number," "number of packages," "weight," and/or "additional shipper info," and values extracted from the bill of lading could include text that is found within fields or regions associated with the corresponding keys. Because the key in each key-value pair identifies and/or semantically contextualizes the corresponding value, key-value pairs extracted from the document can be imported into a database; linked to one another; grouped, sorted, or filtered by key and/or value; outputted to assist users with annotation or labeling tasks; and/or otherwise processed without requiring manual data entry and/or user-generated extraction rules.

As shown in FIG. 4, the machine learning models used to extract key-value pairs from documents 406 include a detection model 410 and/or a segmentation model 412. In some embodiments, input into detection model 410 includes region proposals 448 that are formed from groupings 408 of text bounding boxes 434 for text 432 in documents 406. More specifically, execution engine 324 and/or another component use optical character recognition (OCR) and/or another technique to identify text in a given document. The component also generates text bounding boxes 434 around distinct units of text (e . . . , words, phrases, sentences, lines of text, etc.). The component then generates region proposals 448 as groupings 408 of different combinations of text bounding boxes 434. For example, the component may generate region proposals 448 as rectangular regions that bound different combinations of text bounding boxes 434 in the document, up to a region proposal size limit.

In one or more embodiments, input into detection model 410 also includes a representation of the document from which region proposals 448 were generated. For example, execution engine 324 may input an image of the document into detection model 410. One or more convolutional layers in detection model 410 may be used to convert the input image into one or more feature maps. The feature map(s) and region proposals 448 may then be fed into a Region of Interest (RoI) pooling layer and/or an RoI alignment layer that crop and resize the feature maps according to region proposals 448. The resized feature maps may further fed into a number of additional layers to produce a set of scores 436 that are associated with a number of classes 442. Each score represents a probability that a corresponding region proposal includes text that belongs to a particular class, and all scores 436 for the region proposal sum to 1. A relatively high score (e.g., greater than 0.7 or 0.8) outputted by detection model 410 for a given class thus indicates a high level of confidence that the corresponding bounding box belongs to the class.

In one or more embodiments, classes 442 represent all possible keys and values that can be found in a particular type of document. For example, classes 442 associated with keys in an invoice may include (but are not limited to) "from key," "to key," "invoice no. key," "invoice date key," "due key," "description key," "quantity key," "rate key," "subtotal key," and "total key." Classes 442 associated with values in the invoice may include (but are not limited to) "from value," "to value," "invoice no. value," "invoice date value," "due value," "description value," "quantity value," "rate value," "subtotal value," and "total value." Classes 442 optionally include a "default" class that represents all remaining types of data in the document.

Alternatively, detection model 410 may generate scores 436 for a smaller number of classes 442 representing broader categories of text or data in a document. For example, detection model 410 may generate three scores for a region proposal. The first score may represent the probability that a region proposal includes only text representing a single key, the second score may represent the probability that the region proposal includes only text representing a single value, and the third score may represent the probability that the region proposal includes text that neither represents a single key nor represents a single value (e.g., text that spans multiple keys and/or values).

After scores 436 are generated, execution engine 324 applies one or more filters 440 to region proposals 448 and/or the corresponding scores 436. First, execution engine 324 can filter region proposals 448 with scores 436 that do not meet a numeric, percentile, and/or another type of threshold. Execution engine 324 also, or instead, uses a non-maximum suppression technique to filter region proposals 448 that have high overlap with one another. During the non-maximum suppression technique, execution engine 324 may generate a list of region proposals 448 ordered by descending area (e.g., height multiplied by width). Execution engine 324 selects, from the list, a region proposal with the greatest area and adds the selected region proposal to a subset of region proposals 448 that pass filters 440. Execution engine 324 also removes all region proposals that overlap with the selected region proposal by more than a threshold from the list. Execution engine 324 then repeats the process until all region proposals in the list have either been added to the subset of region proposals 448 that pass filters 440 or have been removed from the list.

Region proposals 448 that pass filters 440 are then inputted with an image of the document and/or the corresponding scores 436 into segmentation model 412. In turn, segmentation model 412 outputs key-value bounding boxes 438 that represent locations of keys and/or key-value pairs in documents 406. Execution engine 324 also determines classes 442 associated with key-value bounding boxes 438. For example, execution engine 324 could assign, to a key-value bounding box outputted by segmentation model 412, a class representing a key associated with the highest score from detection model 410 for the region proposal from which the key-value bounding box was generated.

In one or more embodiments, segmentation model 412 includes a feature-pyramid backbone that converts an image of the document, the filtered region proposals 448, and/or the corresponding scores 436 into feature maps at different scales. Segmentation model 412 up-samples the feature maps into the same scale and uses a number of convolutional and/or concatenation layers to produce a probability map and a threshold map from the up-sampled feature maps. The probability map includes per-pixel probabilities associated with key-value bounding boxes 438, and the threshold map includes per-pixel thresholds for the probabilities in the probability map. Segmentation model 412 then uses an approximate step function to apply the per-pixel thresholds in the threshold map to the corresponding probabilities in the probability map. The output of the approximate step function includes an approximate binary map that stores a substantially 0 or 1 value for each pixel. Finally, segmentation model 412 includes a box formation module that generates key-value bounding boxes 438 from the probability map and/or approximate binary map. To produce key-value bounding boxes 438, the box formation module generates a binary map by binarizing values in the probability map and/or approximate binary map, detects connected regions in the binary map, and dilates the connected regions.

In some embodiments, execution engine 324 omits segmentation model 412 and generate key-value bounding boxes 438 based on scores 436 for region proposals 448 from detection model 410 and/or filters 440. For example, execution engine 324 could use one or more filters 440 to identify a subset of region proposals 448 with scores 436 that meet a first threshold and/or remove smaller region proposals 448 that overlap with larger region proposals 448 beyond a second threshold. Execution engine 324 could then output the filtered region proposals 448 as key-value bounding boxes 438. Execution engine 324 could also output classes 442 as keys associated with the highest scores 436 generated by detection model 410 for filtered region proposals 448.

In one or more embodiments, execution engine 324 reverses the execution of detection model 410 and segmentation model 412. In these embodiments, segmentation model 412 is used to generate region proposals 448 that are inputted into detection model 410, and detection model 410 outputs scores 436 for each of region proposals 448. Execution engine 324 then applies filters 440 to scores 436 and/or region proposals 448 and outputs filtered region proposals 448 and the corresponding classes 442 as representations of keys and/or values in each document.

Those skilled in the art will appreciate that execution engine 324 may combine the output of detection model 410 and/or segmentation model 412 in other ways. For example, execution engine 324 may use detection model 410 to generate scores 436 for region proposals 448 associated with a given document. Execution engine 324 may separately apply segmentation model 412 to an image of the document to generate key-value bounding boxes 438 within the image. Execution engine 324 may then identify regions of the document that contain keys and/or key-value pairs as key-value bounding boxes 438 from segmentation model 412 that have substantial overlap with region proposals 448 associated with scores 436 that exceed a threshold.

After key-value bounding boxes 438 and/or filtered region proposals 448 are generated for a given document, execution engine 324 extracts text associated with key-value pairs from key-value bounding boxes 438 and/or filtered region proposals 448. For example, execution engine 324 may extract a key and/or an associated value from each region proposal and/or key-value bounding box. Execution engine 324 may then output the extracted key and/or value, store the key and/or value in a database or another structured format, associate the key and/or value with the corresponding class, or perform other processing related to the key and/or value.

In some embodiments, execution engine 324 uses a linking model 424 to generate bounding box associations 428 between key-value bounding boxes 438 and a list of items 426 in a given document. More specifically, items 426 can include multiple instances of values under the same key, and bounding box associations 428 can include mappings of individual items 426 to key-value bounding boxes 438 for text associated with items 426. For example, items 426 could include entries in an invoice, and execution engine 324 could use detection model 410 and/or segmentation model 412 to generate key-value bounding boxes 438 for multiple values associated with "item description," "price," "quantity," and/or "subtotal" keys in the invoice. After key-value bounding boxes 438 and the associated classes 442 are generated, execution engine 324 could use linking model 424 to generate bounding box associations 428 so that each entry in the invoice is associated with bounding boxes for the corresponding values under the "item description," "price," "quantity," and/or "subtotal" keys.

First, linking model 424 denotes individual items 426 in the document by a first set of key-value bounding boxes 438 that are assigned to the same class and have a one-to-one correspondence with items 426. For example, linking model 424 could select a set of five key-value bounding boxes 438 associated with a class of "subtotal value" as "anchor" bounding boxes that are enumerated from 1 to 5 to represent five different items 426 in an invoice. Thus, bounding box associations 428 include one-to-one mappings between the first set of key-value bounding boxes 438 and numeric identifiers for items 426.

Next, linking model 424 uses alignment and/or distance between the first set of key-value bounding boxes 438 and additional sets of key-value bounding boxes 438 that are assigned to other classes 442 associated with items 426 to generate additional bounding box associations 428 between key-value bounding boxes 438 and items 426. In particular, linking model 424 may generate a mapping between a first bounding box in the first set of key-value bounding boxes 438 and a second bounding box that has a perfect or near-perfect row-based alignment with the bounding box (e.g., when the y-coordinates spanned by both bounding boxes match or almost match). In turn, the mapping represents an additional association between the second bounding box and the item represented by the first bounding box.

Linking model 424 additionally uses a Hungarian technique to associate items 426 with remaining key-value bounding boxes 438 that are assigned to other classes 442. For example, linking model 424 may iterate over sets of key-value bounding boxes 438 that are assigned to classes 442 associated with items 426 in the document (e.g., key-value bounding boxes 438 assigned to the "description value," "quantity value," "rate value," "subtotal value," and "total value" classes 442 for an invoice). For each set of key-value bounding boxes assigned to one of these classes, linking model 424 may generate mappings between the set of key-value bounding boxes and the first set of key-value bounding boxes 438 in a way that maximizes the overall row-based alignment and/or minimizes the overall vertical separation between the two sets of key-value bounding boxes. Linking model 424 thus generates additional bounding box associations 428 as mappings between each set of key-value bounding boxes 438 and the first set of key-value bounding boxes 438 representing individual items 426 in the list.

Those skilled in the art will appreciate that a single item may be associated with multiple bounding boxes and/or lines of text for a given key. For example, an entry in an invoice may include a single bounding box for a value associated with the "subtotal," "price," or "quantity" key and multiple boxes for multiple lines of text associated with the "description" key. As a result, the number of bounding boxes for values associated with the "description" key may outnumber the number of items 426 in the document and/or the number of "anchor" bounding boxes representing items 426.

When the number of key-value bounding boxes 438 assigned to a class that is associated with items 426 exceeds the number of items 426, linking model 424 initially generates one-to-one mappings between the anchor bounding boxes for items 426 and key-value bounding boxes 438 assigned to the class that have the best overall row-based alignment and/or shortest vertical separation with the anchor bounding boxes. Linking model 424 then iterates over remaining key-value bounding boxes 438 that are assigned to the class but not yet mapped to the anchor bounding boxes. During each iteration, linking model 424 identifies a key-value bounding box that is closest to another key-value bounding box that has been mapped to an anchor bounding box. For example, linking model 424 could identify a first key-value bounding box that is positioned one line below a second key-value bounding box that is mapped to the anchor bounding box. Linking model 424 then maps the identified key-value bounding box to the same anchor bounding box. Linking model 424 continues iterating over remaining key-value bounding boxes 438 assigned to the class until all key-value bounding boxes 438 assigned to the class have been mapped to the anchor bounding boxes. Continuing with the above example, linking model 424 may continue mapping key-value bounding boxes 438 for additional lines that appear below the second key-value bounding box to the anchor bounding box until linking model 424 is unable to find a key-value bounding box that is closest to any key-value bounding boxes that are mapped to the anchor bounding box.

Finally, linking model 424 may remove a mapping when the horizontal distance between the corresponding bounding boxes exceeds a threshold. For example, linking model 424 could delete a mapping between a first bounding box assigned to the "subtotal value" class and a second bounding box that is assigned to the "item description value" class when the second bounding box appears at the top of the document (and is thus likely to be misclassified as "item description value") and the first bounding box appears at the middle of the document. The operation of linking model 424 is described in further detail below with respect to FIGS. 5B-5H.

Training engine 322 trains detection model 410 and/or segmentation model 412 to identify keys and/or key-value pairs in documents. Training engine 322 includes a data-generation component 402 that produces training data for detection model 410 and/or segmentation model 412. Training engine 322 also includes an update component 404 that uses the training data to update detection model parameters 420 of detection model 410 and/or segmentation model parameters 422 of segmentation model 412.

In one or more embodiments, data-generation component 402 generates training data that includes synthetic key-value pairs 416 and/or synthetic documents 418. As shown in FIG. 4, data-generation component 402 generates synthetic key-value pairs 416 using key-value pairs 414 extracted from real documents (e.g., key-value pairs 414 identified by a set of users in an annotation or labeling task). Synthetic key-value pairs 416 include layout and/or formatting that resembles those of real key-value pairs 414 and content that differs from that of real key-value pairs 414.

Data-generation component 402 may use a number of techniques to generate synthetic key-value pairs 416. For example, data-generation component 402 may use key-value pairs 414 as training data for a generative adversarial network (GAN), variational autoencoder (VAE), and/or another type of generative model. After the generative model is trained, data-generation component 402 may obtain synthetic key-value pairs 416 as output from the generative model. In another example, data-generation component 402 may generate synthetic key-value pairs 416 by reordering characters and/or text in key-value pairs 414, substituting text in key-value pairs 414 with random text (e.g., random words, characters, and/or phrases), and/or substituting text in key-value pairs 414 with similar text (e.g., substituting a number with a different number of the same length, substituting a first and last name with a different first and last name, etc.).

Data-generation component 402 may also combine synthetic key-value pairs 416 into synthetic documents 418. For example, data-generation component 402 may generate synthetic documents 418 by replacing key-value pairs 414 in real documents with synthetic key-value pairs 416 that have the same formatting. In another example, data-generation component 402 may place a randomly selected set of synthetic key-value pairs 416 into non-overlapping regions within a synthetic document.

Update component 404 uses key-value pairs 414, synthetic key-value pairs 416, and/or synthetic documents 418 to update detection model parameters 420 of detection model 410 and/or segmentation model parameters 422 of segmentation model 412. In one or more embodiments, update component 404 performs supervised training that updates detection model parameters 420 based on detection predictions 450 and the corresponding region proposal labels 452, as well as supervised training that updates segmentation model parameters 422 based on segmentation predictions 454 and the corresponding bounding box labels 456.

For example, update component 404 may assign a label of 1 to region proposals 448 that include individual key-value pairs 414 and/or synthetic key-value pairs 416. Update component 404 may also assign a label of 0 to region proposals 448 that include text that belongs to more than one key from key-value pairs 414 and/or synthetic key-value pairs. Update component 404 may apply detection model 410 to the labeled region proposals 448 and use stochastic gradient descent and backpropagation to update detection model parameters 420 in a way that reduces errors between detection predictions 450 generated by detection model 410 from the inputted region proposals 448 and the corresponding region proposal labels 452.

Continuing with the above example, after detection model 410 is trained, update component 404 may input images of real documents, synthetic documents 418, and/or additional features (e.g., filtered region proposals 448 and/or scores 436 for the filtered region proposals 448 from detection model 410) into segmentation model 412. Update component 404 may use stochastic gradient descent and backpropagation to update segmentation model parameters 422 in a way that reduces errors between segmentation predictions 454 outputted by segmentation model 412 and the corresponding bounding box labels 456 (e.g., bounding boxes for key-value pairs 414 and/or synthetic key-value pairs 416).

Update component 404 may optionally perform end-to-end training of detection model 410 and segmentation model 412, in lieu of or in addition to separate or staged training of detection model 410 and segmentation model 412. For example, update component 404 may input region proposals 448 associated with positive and negative region proposal labels 452 into detection model 410 to produce detection predictions 450 corresponding to scores 436 for the inputted samples. Update component 404 may apply filters 440 to the inputted region proposals 448 and input the filtered region proposals 448 along with images of the corresponding documents and/or the corresponding scores 436 into segmentation model 412. Update component 404 may calculate prediction errors between segmentation predictions 454 generated by segmentation model 412 and the corresponding bounding box labels 456 and use stochastic gradient descent to iteratively update segmentation model parameters 422 and detection model parameters 420 based on the negative gradients of the backpropagated errors. The trained detection model 410 and segmentation model 412 may then be used to identify locations of keys and/or key-value pairs in new documents 406, as discussed above.

When segmentation model 412 is used to generate region proposals 448 that are inputted into detection model 410, update component 404 may train segmentation model 412 before detection model 410, so that scores 436 outputted by detection model 410 are adapted to region proposals 448 generated by segmentation model 412. Update component 404 can also, or instead, perform end-to-end training of segmentation model 412 and detection model 410. For example, update component 404 may use segmentation model 412 to generate region proposals 448 from an image of a document and input region proposals 448 into detection model 410. Update component 404 may calculate prediction errors between detection predictions 450 generated by detection model 410 and the corresponding region proposal labels 452 and use stochastic gradient descent to iteratively update detection model parameters 420 and segmentation model parameters 422 based on the negative gradients of the backpropagated errors. In other words, update component 404 may adapt the training of detection model 410 and segmentation model 412 to the use of detection model 410 and segmentation model 412 by execution engine 324.

FIG. 5A illustrates an exemplar extraction of key-value pairs from a document, according to various embodiments. As shown in FIG. 5A, the key-value pairs are represented by a number of bounding boxes 502-520 around text in the document. Bounding box 502 includes text associated with a "From" key, bounding box 504 includes text associated with a "To" key, bounding box 506 includes text associated with an "Invoice No." key, bounding box 508 includes text associated with an "Invoice Date" key, and bounding box 510 includes text associated with a "Due" key. Bounding box 512 includes text associated with a "Description" key, bounding box 514 includes text associated with a "Quantity" key, bounding box 516 includes text associated with a "Rate" key, bounding box 518 includes text associated with a "Subtotal" key, and bounding box 520 includes text associated with a "Total" key.

Bounding boxes 502-520 can be generated based on output from detection model 410 and/or segmentation model 412. For example, bounding boxes 502-520 may include region proposals with scores 436 from detection model 410 that exceed a threshold. In this example, each bounding box may be formed as a grouping of one or more region proposals with top scores 436 that exceed the threshold and are associated with the same key (e.g., region proposals assigned to classes 442 representing text for the key and/or a value associated with the key). Bounding boxes 502-520 may also, or instead, be generated by segmentation model 412 based on an image of the document, region proposals with scores 436 from detection model 410 that exceed a threshold, and/or the corresponding scores 436. As mentioned above, detection model 410 and/or segmentation model 412 may be trained to recognize key-value pairs with different types of formatting, such as values that appear under the corresponding keys (e, within bounding boxes 502, 504, 512, 514, 516, 518), values that appear next to the corresponding keys (e, within bounding boxes 506, 508, 510, and 520), keys that are followed by colons (e.g., within bounding boxes 502, 504, 506, 508, and 510), keys that are underlined (e.g., within bounding boxes 512, 514, 516, and 518), and keys that are neither followed by colons nor underlined (e.g., within bounding box 520).

Bounding boxes 502-520 can also be used to extract the corresponding keys and/or values from the document. For example, text from each bounding box may be stored in a corresponding key-value pair. A key-value pair for bounding box 502 may include a key of "From" and a value of "John Smith 123 Main St. New York, NY," a key-value pair for bounding box 506 may include a key of "Invoice No." and a value of "001," a key-value pair for bounding box 514 may include a key of "Quantity" and a value of "1 2," and so on. Consequently, the key in each key-value pair may be set to the name of a field in the document, and the value in the key-value pair may be set to one or more values that are grouped under the field.

Figure 5B:
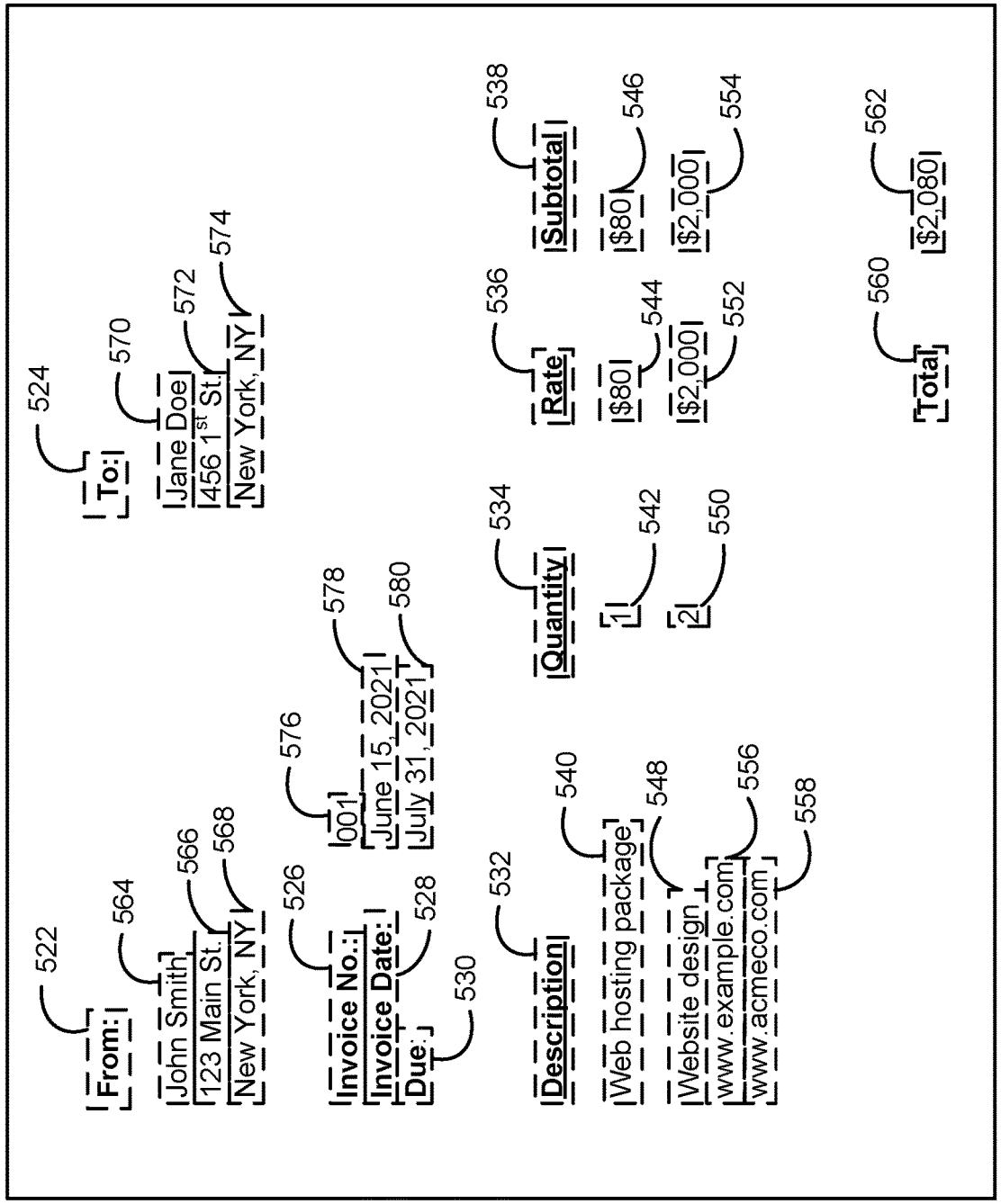
FIG. 5B illustrates an exemplar extraction of key-value pairs from a document, according to various embodiments.

FIG. 5B illustrates an exemplar extraction of key-value pairs from a document, according to various embodiments. More specifically, FIG. 5B shows a different set of bounding boxes 522-562 associated with key-value pairs in the document of FIG. 5A. As shown in FIG. 5B, bounding boxes 522-562 are limited to single lines of text in the document.

For example, bounding boxes 522-562 could be generated by segmentation model 412 and/or combinatorically as region proposals that bound individual phrases of text in the document.

Each bounding box can be associated with a class based on a corresponding set of scores 436 generated by detection model 410 for the bounding box. For example, each of bounding boxes 522-562 may be assigned to a class associated with the highest score generated by detection model 410, after the highest score is verified to exceed a threshold. In this example, bounding box 522 may be associated with a class of "from key," bounding box 524 may be associated with a class of "to key," bounding box 526 may be associated with a class of "invoice no. key," bounding box 528 may be associated with a class of "invoice date key," and bounding box 530 may be associated with a class of "due key." Bounding box 532 may be associated with a class of "description key," bounding box 534 may be associated with a class of "quantity key," bounding box 536 may be associated with a class of "rate key," and bounding box 538 may be associated with a class of "subtotal key." Bounding boxes 564-568 may be associated with a class of "from value," bounding boxes 570-574 may be associated with a class of "to value," bounding box 576 may be associated with a class of "invoice no. value," bounding box 578 may be associated with a class of "invoice date value," and bounding box 580 may be associated with a class of "due value." Bounding boxes 540, 548, 556, and 558 may be associated with a class of "description value," bounding boxes 542 and 550 may be associated with a class of "quantity value," bounding boxes 544 and 552 may be associated with a class of "rate value," and bounding boxes 546 and 554 may be associated with a class of "subtotal value." Bounding box 560 may be associated with a class of "total key," and bounding box 562 may be associated with a class of "total value."

Figure 5C:
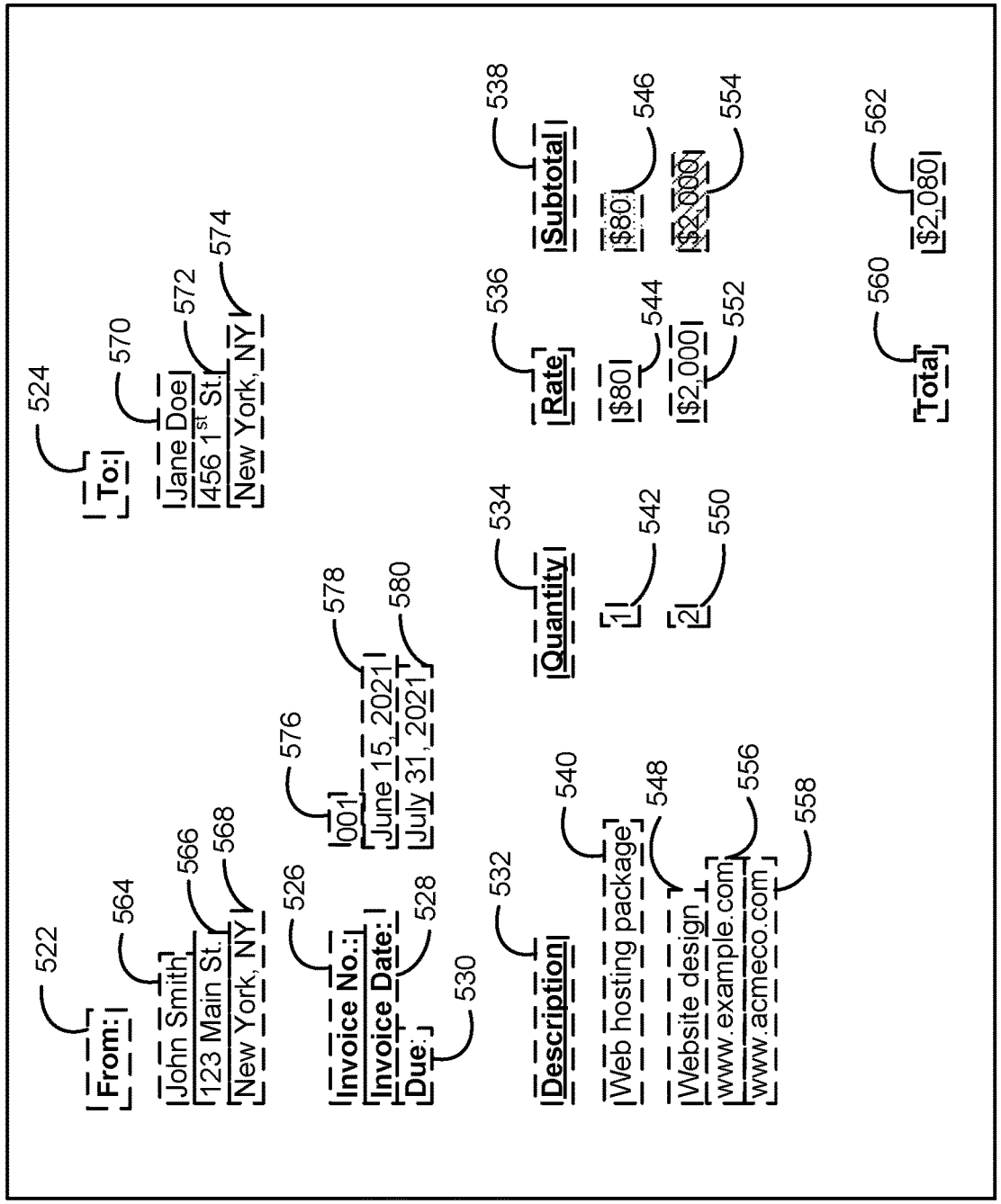
FIG. 5C illustrates an exemplar association of one or more bounding boxes with a list of items in the document of FIG. 5B, according to various embodiments.

FIG. 5C illustrates an exemplar association of one or more bounding boxes 546 and 554 with a list of items 426 in the document of FIG. 5B, according to various embodiments. As mentioned above, bounding box associations 428 include mappings between each item in the list and one or more bounding boxes for text associated with the item. In the document of FIGS. 5B-5C, the items are associated with text assigned to the "description value," "quantity value," "rate value," and "subtotal value" classes 442.

More specifically, bounding boxes 546 and 554 assigned to the "subtotal value" class include two different types of shading to indicate bounding box associations 428 with two different items 426 in the list. These associations indicate that bounding boxes 546 and 554 are used as horizontal "anchors" for the two items 426 in the list. Further, bounding boxes 546 and 554 assigned to the "subtotal value" key may be selected as the anchors because the "subtotal" field in a given document is typically associated with a single line of text per item.

Figure 5D:
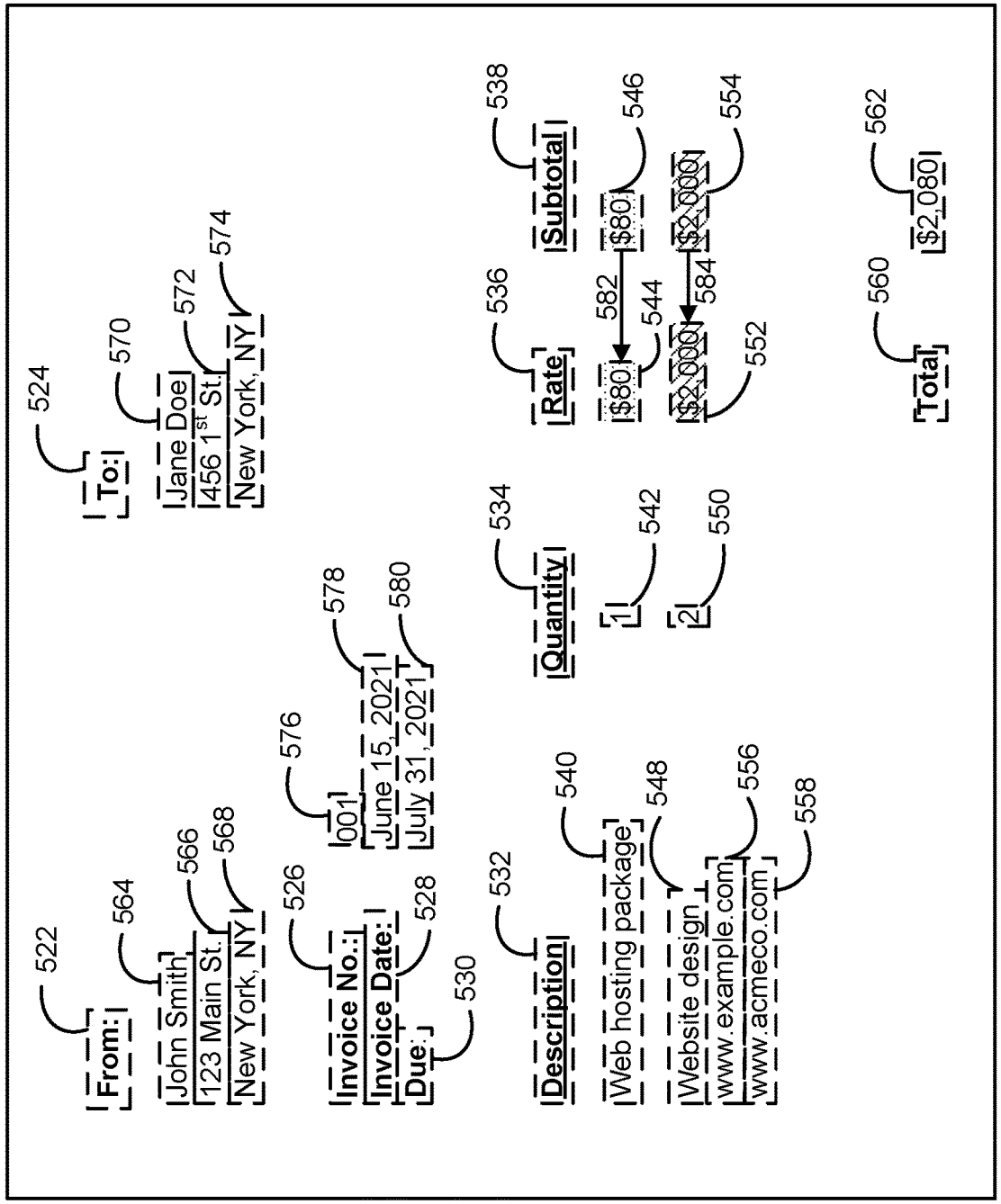
FIG. 5D illustrates an exemplar association of one or more bounding boxes with a list of items in the document of FIG. 5B, according to various embodiments.

FIG. 5D illustrates an exemplar association of one or more bounding boxes 544 and 552 with a list of items 426 in the document of FIG. 5B, according to various embodiments. In particular, FIG. 5D shows the generation of a first mapping 582 between bounding boxes 546 and 544 and a second mapping 584 between bounding boxes 554 and 552.

Mappings 582 and 584 may be established based on row-based alignment between bounding boxes 546 and 544 and between bounding boxes 554 and 552. For example, mappings 582 and 584 may be made to minimize the overall vertical separation between bounding boxes 546 and 554 associated with the "subtotal value" key and bounding boxes 544 and 552 associated with the "rate value" key. Mappings 582 and/or 584 may also, or instead, be made when bounding box 544 has perfect or near-perfect y-coordinate alignment with bounding box 546 and/or when bounding box 552 has perfect or near-perfect y-coordinate alignment with bounding box 554. After mapping 582 is made, bounding box 544 is associated with the same first item as bounding box 546, as indicated by the same shading in both bounding boxes 544 and 546. Similarly, after mapping 584 is made, bounding box 552 is associated with the same second item as bounding box 554, as indicated by the same shading in both bounding boxes 552 and 554.

Figure 5E:
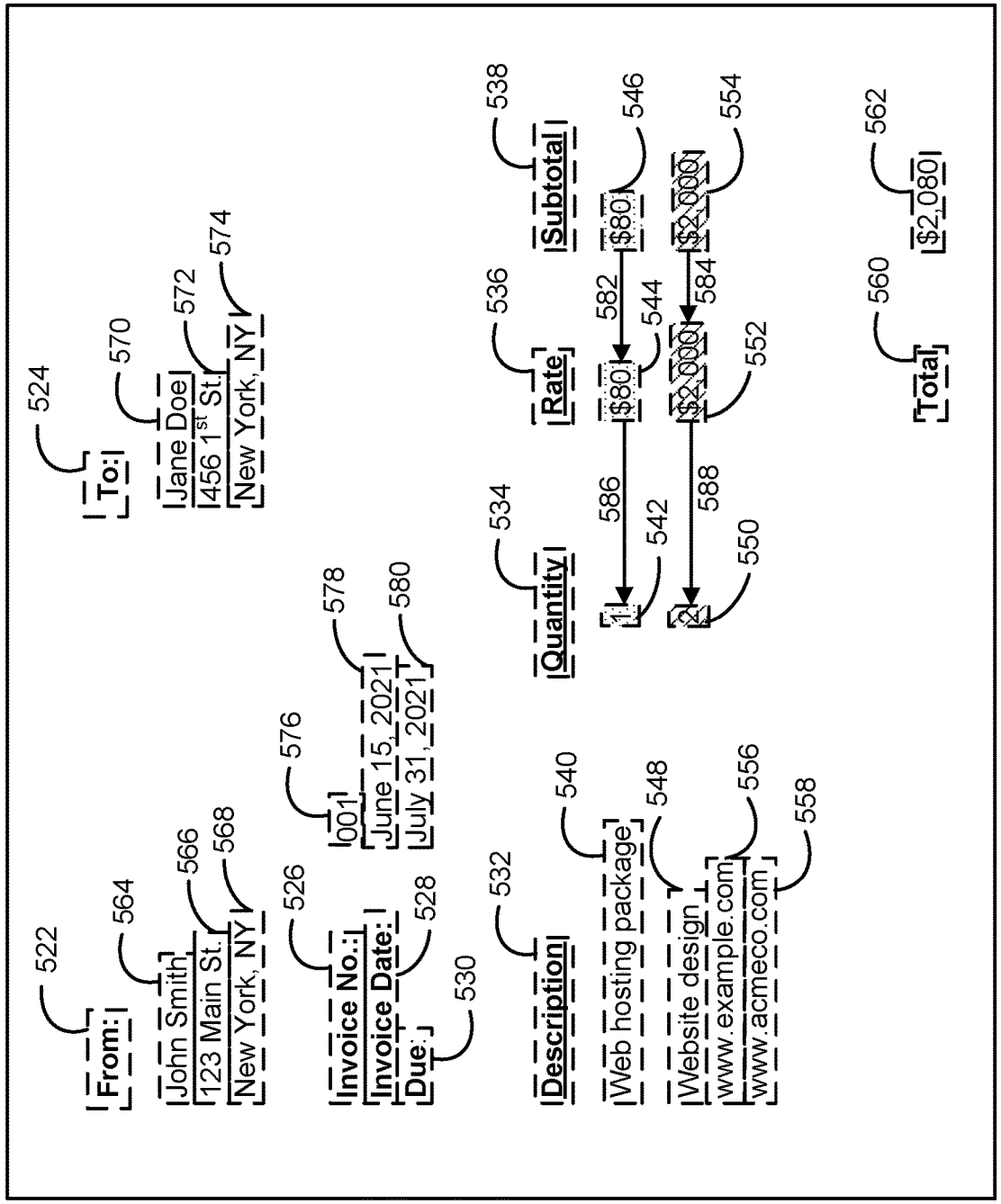
FIG. 5E illustrates an exemplar association of one or more bounding boxes with a list of items in the document of FIG. 5B, according to various embodiments.

FIG. 5E illustrates an exemplar association of one or more bounding boxes 542 and 550 with a list of items 426 in the document of FIG. 5B, according to various embodiments. In particular, FIG. 5E shows a third mapping 586 between bounding boxes 544 and 542 and a fourth mapping 588 between bounding boxes 552 and 550.

Mappings 586 and 588 may be generated based on row-based alignment between bounding boxes 544 and 542 and between bounding boxes 552 and 550. Alternatively, mappings 586 and 588 may be established based on row-based alignment between bounding boxes 546 and 542 and between bounding boxes 554 and 550. For example, mappings 586 and 588 may be made to maximize the overall row-based alignment between bounding boxes 542 and 550 associated with the "quantity value" key and bounding boxes 544 and 552 associated with the "rate value" key and/or to maximize the overall row-based alignment between bounding boxes 542 and 550 associated with the "quantity value" key and bounding boxes 546 and 554 associated with the "subtotal value" key.

In turn, mappings 586 and 588 associate bounding boxes 542 and 550 with the corresponding items 426 in the list, as indicated by a first type of shading in bounding boxes 542, 544, and 546 and a second type of shading in bounding boxes 550, 552, and 554. More specifically, mappings 586 and 582 can be combined to establish a mapping between bounding boxes 542 and 546, and mappings 584 and 588 can be combined to establish a mapping between bounding boxes 550 and 554.

Figure 5F:
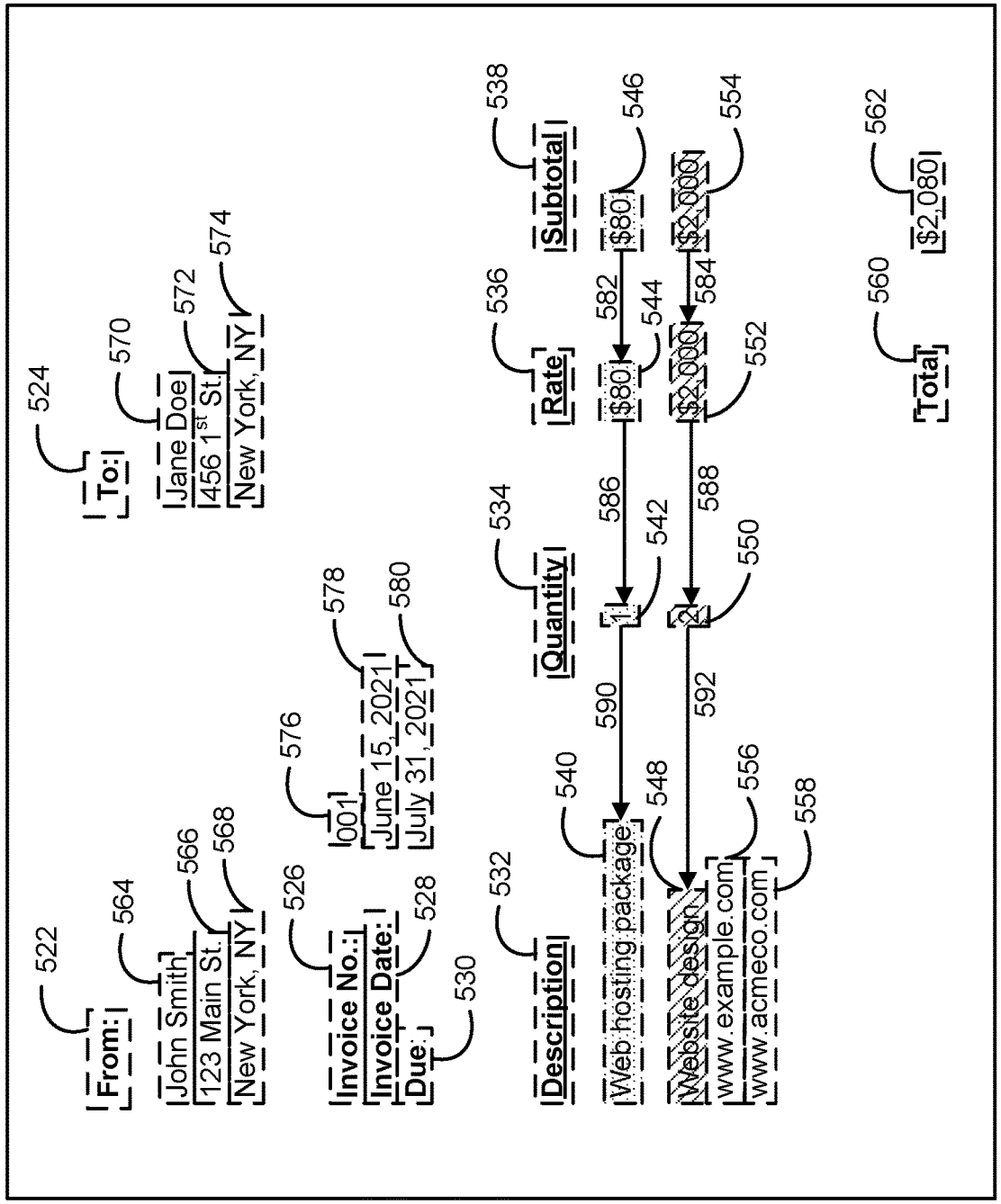
FIG. 5F illustrates an exemplar association of one or more bounding boxes with a list of items in the document of FIG. 5B, according to various embodiments.

FIG. 5F illustrates an exemplar association of one or more bounding boxes 540 and 548 with a list of items 426 in the document of FIG. 5B, according to various embodiments. As shown in FIG. 5F, bounding box 540 is associated with the first item in the list via a mapping 590 with bounding box 542, and bounding box 548 is associated with the second item in the list via a mapping 592 with bounding box 550. Mappings 590-592 may be determined to maximize the overall alignment between bounding boxes 540 and 548 associated with the "description value" key and one or more bounding boxes 542-546 and/or 550-554 associated with each item. For example, mapping 590 may be generated because bounding box 540 under the "description" column has the best row-based alignment with one or more other bounding boxes 542-546 associated with the first item. Similarly, mapping 592 may be generated because bounding box 548 under the "description" column has the best row-based alignment with one or more other bounding boxes 550-554 associated with the second item.

Mappings 590 and 592 additionally associate bounding boxes 540 and 548 with the corresponding items 426 in the list, as indicated by the first type of shading in bounding boxes 540, 542, 554, and 546 and the second type of shading in bounding boxes 548, 550, 552, and 554. Mappings 590, 582, and 582 may additionally be combined to establish a mapping between bounding boxes 540 and 546, and mappings 592, 588, and 584 may be combined to establish a mapping between bounding boxes 548 and 554.

Figure 5G:
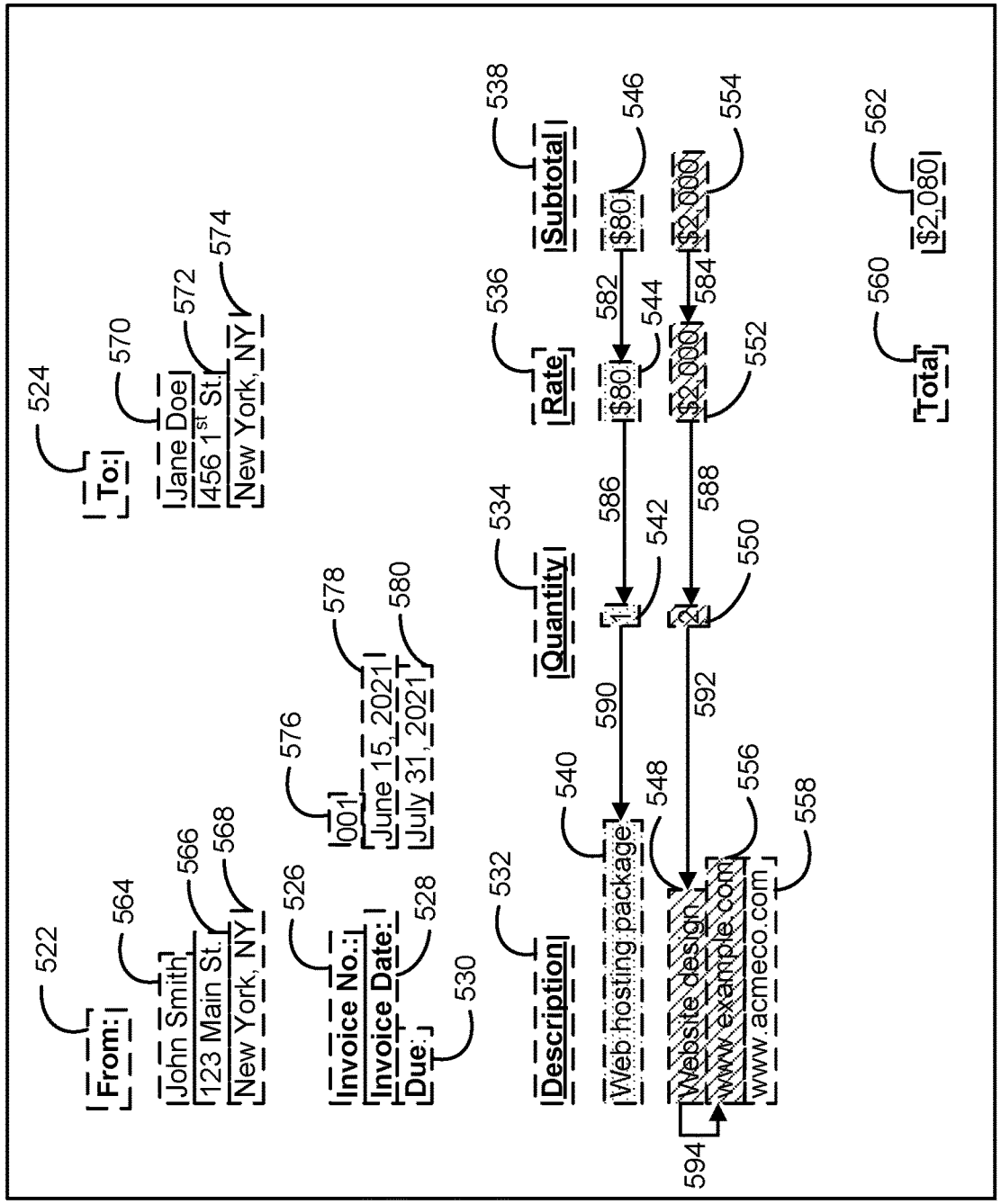
FIG. 5G illustrates an exemplar association of one or more bounding boxes with a list of items in the document of FIG. 5B, according to various embodiments.

FIG. 5G illustrates an exemplar association of one or more bounding boxes (e.g., bounding box 556) with a list of items 426 in the document of FIG. 5B, according to various embodiments. In particular, FIG. 5G shows a mapping 594 between bounding boxes 548 and 556, which establishes an association between bounding box 556 and the second item in the list.

Mapping 594 may be generated based on spatial proximity between bounding boxes 548 and 556, after mapping 592 between bounding boxes 548 and 550 is made. For example, mapping 594 may be made between bounding box 556 and bounding box 548 to which bounding box 556 is nearest to assign additional lines associated with the "description value" class to one or more items 426 in the list.

Figure 5H:
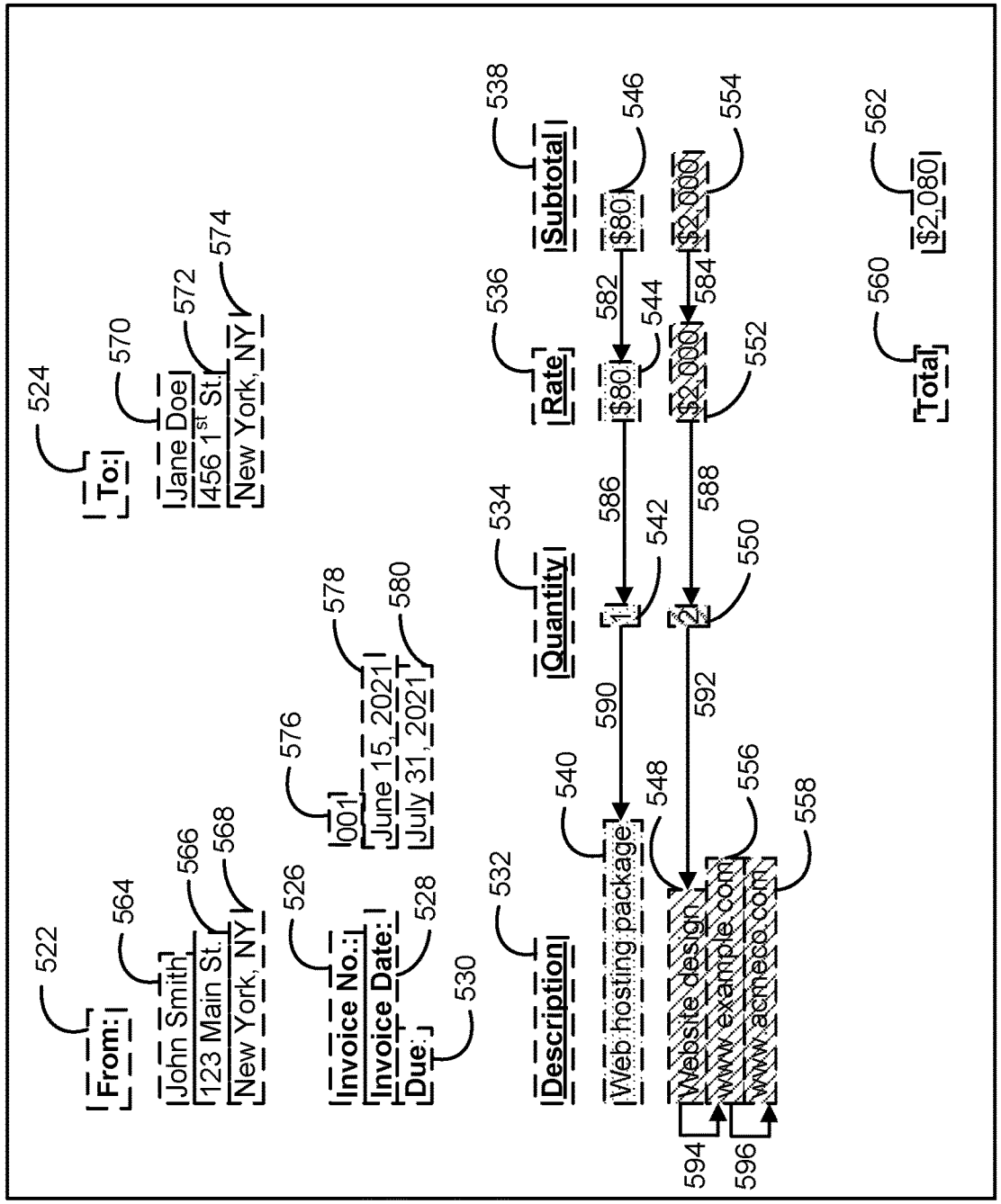
FIG. 5H illustrates an exemplar association of one or more bounding boxes with a list of items in the document of FIG. 5B, according to various embodiments.

FIG. 5H illustrates an exemplar association of one or more bounding boxes (e.g., bounding box 558) with a list of items 426 in the document of FIG. 5B, according to various embodiments. More specifically, FIG. 5H shows a mapping 596 between bounding box 556 and bounding box 558, which establishes an association between bounding box 558 and the second item in the list. After mappings 592 and 594 are made, mapping 596 may be established based on spatial proximity between bounding boxes 556 and 558 to assign additional lines associated with the "description value" class to one or more items 426 in the list.

Thus, mapping 596 completes bounding box associations 428 between the two items 426 in the list and all bounding boxes 540-558 for text in the list. Mappings 582, 586, and 590 establish bounding box associations 428 between the first item and bounding boxes 540-546, and mappings 584, 588, 592, 594, and 596 establish bounding box associations 428 between the second item and bounding boxes 550-558.

Figure 6:
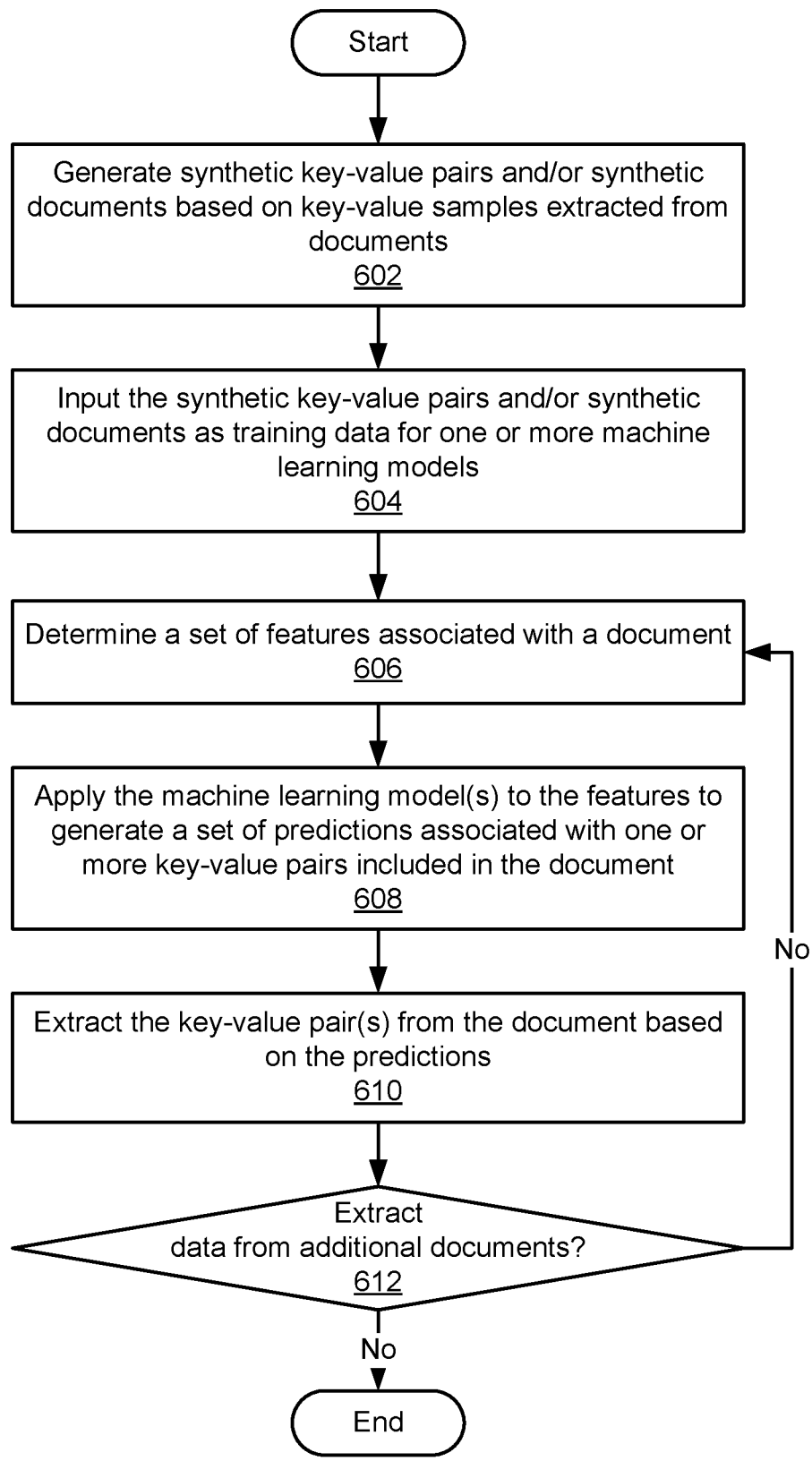
FIG. 6 is a flow diagram of method steps for extracting data from a document, according to various embodiments.

FIG. 6 is a flow diagram of method steps for extracting data from a document, according to various embodiments. Although the method steps are described with reference to the system of FIGS. 1-4, persons skilled in the art will understand that any system may be configured to implement the method steps, in any order, in other embodiments.

As shown, training engine 322 generates 602 synthetic key-value pairs and/or synthetic documents based on key-value samples extracted from documents. For example, training engine 322 could train a generative model based on the key-value samples and use the trained generative model to generate synthetic key-value pairs. In another example, training engine 322 could generate the synthetic key-value pairs by modifying the text in the key-value samples and keeping the formatting of the key-value samples. In a third example, training engine 322 could generate a synthetic document by replacing key-value pairs in a real document with corresponding synthetic key-value pairs and/or arranging synthetic key-value pairs within a pre-specified or arbitrary document layout.

Next, training engine 322 inputs 604 the synthetic key-value pairs and/or synthetic documents as training data for one or more machine learning models. For example, training engine 322 may use synthetic and/or real key-value pairs to train a detection model so that the detection model is able to distinguish between region proposals that include text associated with a single key and region proposals that include text that spans multiple keys (e, region proposals that cross the boundaries of two or more fields in a form). In another example, training engine 322 may use synthetic and/or real key-value pairs and/or documents to train a segmentation model so that the segmentation model learns to generate bounding boxes for individual keys and/or key-value pairs within a document.

Execution engine 324 then uses the trained machine learning model(s) to identify key-value pairs in additional documents. First, execution engine 324 determines 606 a set of features associated with a document. For example, execution engine 324 may generate a set of region proposals within the document, where each region proposal represents a grouping of one or more bounding boxes for one or more portions of text (e, words, phrases, etc.) within the document. Execution engine 324 may also, or instead, generate and/or aggregate feature maps associated with the document and/or region proposals.

Next, execution engine 324 applies 608 the machine learning model(s) to the features to generate a set of predictions associated with one or more key-value pairs included in the document. For example, execution engine 324 may apply the detection model to the region proposals and/or feature maps to generate a set of scores, with each score representing a predicted probability that the corresponding region proposal includes text associated with a single key. Execution engine 324 may also, or instead, apply the segmentation model to an image of the document and/or additional features (e.g., region proposals in the document with scores that exceed a threshold, scores associated with the region proposals, feature maps associated with the region proposals, etc.) to produce bounding boxes for predicted keys and/or key-value pairs in the document.

Execution engine 324 then extracts 610 the key-value pair(s) from the document based on the predictions. For example, execution engine 324 may remove region proposals with scores from the detection model that fail to meet a threshold and/or region proposals that have substantial overlap with larger region proposals. Execution engine 324 may then extract text corresponding to keys and/or values from the remaining region proposals. In another example, execution engine 324 may extract keys and/or values from bounding boxes outputted by the segmentation model. In a third example, execution engine 324 may remove bounding boxes that do not have substantial overlap with region proposals associated with high scores from the detection model before extracting keys and/or values from remaining bounding boxes outputted by the segmentation model.

Execution engine 324 may repeat operations 606-610 to extract 612 data from additional documents. For example, execution engine 324 may use operations 606-610 to identify and extract key-value pairs from documents with different layouts, content, and/or languages.

Figure 7:
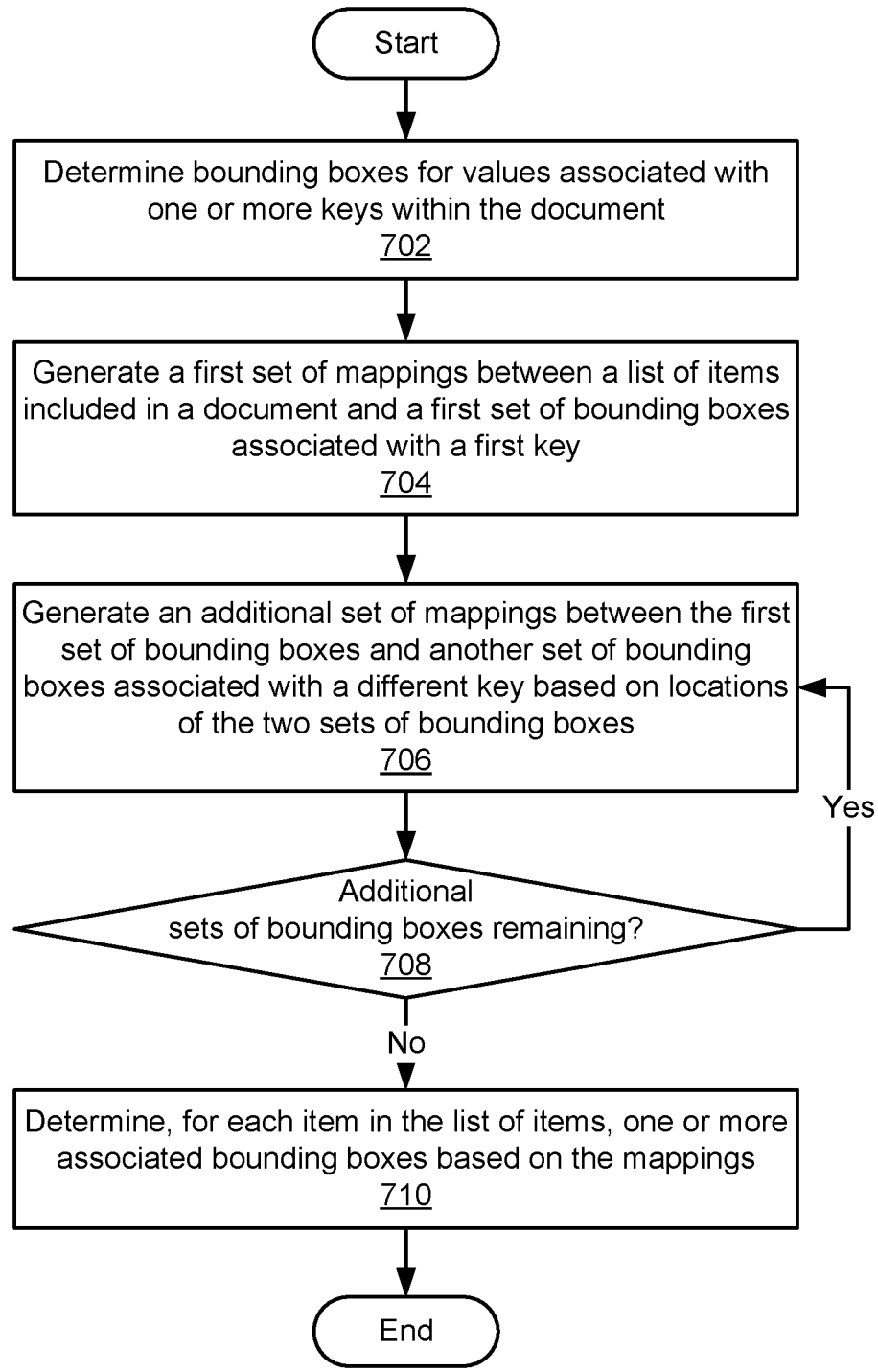
FIG. 7 is a flow diagram of method steps for associating bounding boxes with a list of items in a document, according to various embodiments.

FIG. 7 is a flow diagram of method steps for associating bounding boxes with a list of items in a document, according to various embodiments. Although the method steps are described with reference to the system of FIGS. 1-4, persons skilled in the art will understand that any system may be configured to implement the method steps, in any order, in other embodiments.

As shown, execution engine 324 determines 702 bounding boxes for values associated with one or more keys within the document. As discussed above, execution engine 324 may use a detection model, segmentation model, and/or another type of machine learning model to generate bounding boxes for words, phrases, sentences, lines of text, and/or other distinct units of text in the document and assign classes representing keys and/or associated values to the bounding boxes.

Next, execution engine 324 generates 704 a first set of mappings between a list of items included in a document and a first set of bounding boxes associated with a first key. For example, execution engine 324 may denote individual items in the document by the first set of key-value bounding boxes, which are assigned to the same class and have a one-to-one correspondence with items. Thus, the first set of key-value bounding boxes acts as positional "anchors" for items in the list.

Execution engine 324 generates 706 an additional set of mappings between the first set of bounding boxes and another set of bounding boxes associated with a different key based on locations of the two sets of bounding boxes. For example, execution engine 324 may generate the additional set of mappings in a way that maximizes an overall row-based alignment between the two sets of bounding boxes (a based on one or more coordinates associated with each bounding box in the document). When a first bounding box included in the first set of bounding boxes and a second bounding box included in the second set of bounding boxes have perfect or near-perfect row-based alignment (e.g., when the two bounding boxes have the same or nearly the same y-coordinates), execution engine 324 may automatically generate a mapping between the two bounding boxes, independent of the overall horizontal alignment between the two sets of bounding boxes. If the other set of bounding boxes has more bounding boxes than the first set of bounding boxes, execution engine 324 may initially generate one-to-one mappings between a subset of bounding boxes in the other set of bounding boxes and the first set of bounding boxes. Execution engine 324 may then generate additional mappings between remaining bounding boxes in the other set of bounding boxes and the first set of bounding boxes in an iterative manner, so that an unmapped bounding box that is closest to a bounding box with a mapping to an anchor bounding box in the first set of bounding boxes is also mapped to the same anchor bounding box. Finally, execution engine 324 may remove a mapping between a first bounding box included in the first set of bounding boxes and a second bounding box included in the second set of bounding boxes when the distance the two bounding boxes exceeds a threshold.

Execution engine 324 determines 708 whether or not additional sets of bounding boxes remain to be mapped to the first set of bounding boxes. For example, execution engine 324 may determine that additional sets of bounding boxes are to be mapped to the first set of bounding boxes when the additional sets of bounding boxes are assigned to classes associated with the list of items (e.g., classes representing values that commonly appear within a list of items associated with a given type of document). Execution engine 324 then repeats operation 706 for each set of bounding boxes to be mapped to the first set of bounding boxes.

Finally, execution engine 324 determines 710, for each item in the list of items, one or more associated bounding boxes based on the mappings. For example, execution engine 324 may identify a set of bounding boxes that includes text associated with a given item in the list based on a mapping from an anchor bounding box to the item and additional mappings between the anchor bounding box and other bounding boxes generated in operations 706-708. Execution engine 324 may then output the bounding boxes and/or text in the bounding boxes to extract data associated with the item from the document.

In sum, the disclosed techniques use machine learning techniques to extract key-value pairs from documents. Region proposals that represent groupings of bounding boxes for portions of text in a document are inputted into a detection model, and the detection model generates scores representing predicted probabilities that the region proposals include text associated with single keys. Keys and/or values are then extracted from region proposals with scores from the detection model that exceed a threshold. A segmentation model can additionally be applied to the document, region proposals with scores that exceed a threshold, and/or other input to produce bounding boxes for keys and/or key-value pairs in the document. The keys and/or key-value pairs can then be extracted from the bounding boxes, in lieu of or in addition to extracting keys and/or key-value pairs from region proposals with scores from the detection model that exceed a threshold.

When the document includes a list of items, individual items in the list are denoted by "anchor" bounding boxes that are assigned to the same key and have a one-to-one correspondence with the items. Additional mappings between the anchor bounding boxes and other bounding boxes assigned to keys that are associated with the items in the list are then generated based on alignment and/or distance between the anchor bounding boxes and the other bounding boxes. The mappings can then be used to associate the bounding boxes with the items and extract data associated with the items from the bounding boxes. For example, a list of entries in an invoice may include text under "description," "quantity," "rate," and "subtotal" columns in a table. Bounding boxes for text associated with the "subtotal" column may be used as anchor bounding boxes because each item is typically associated with a single "subtotal" value. Bounding boxes for text associated with the "description," "quantity," and "rate" columns may then be mapped to the "subtotal" bounding boxes in a way that maximizes the overall row-based alignment between each set of bounding boxes and the "subtotal" bounding boxes. Mappings between each anchor bounding box and additional bounding boxes associated with the "description," "quantity," and "rate" columns may further be used to group the bounding boxes under the corresponding item and/or extract data related to the item from the bounding boxes.

One technical advantage of the disclosed techniques relative to the prior art is that key-value pairs are extracted from documents and linked without requiring user input or review. Thus, the disclosed techniques can be used to extract and link data elements and the associated semantic context from documents in a more efficient and less resource-intensive manner than conventional approaches that involve manual data entry and/or user configuration of data extraction rules or workflows. Another advantage of the disclosed techniques is more accurate extraction and linking of keys and/or values from documents that vary in structure or content, compared with conventional machine learning approaches that identify data elements in documents based on the content and ordering of words in the documents and/or the overall structure of the documents. These technical advantages provide one or more technological improvements over prior art approaches.

1. In some embodiments, a computer-implemented method for extracting data from a document comprises determining, via execution of one or more machine learning models, a first set of bounding boxes for a first set of values associated with a first key within the document and a second set of bounding boxes for a second set of values associated with a second key within the document, generating a first set of mappings between a list of items included in the document and the first set of bounding boxes, generating a second set of mappings between the first set of bounding boxes and the second set of bounding boxes based on a first set of locations of the first set of bounding boxes and a second set of locations of the second set of bounding boxes, and determining, for a given item included in the list of items, one or more associated bounding boxes included in the first set of bounding boxes and the second set of bounding boxes based on the first set of mappings and the second set of mappings.

2. The computer-implemented method of clause 1, wherein determining the first set of bounding boxes and the second set of bounding boxes comprises applying a first machine learning model to a set of region proposals that bound one or more portions of text within the document to generate a set of predictions associated with one or more key-value pairs included in the document, and determining the first set of bounding boxes and the second set of bounding boxes based on the set of predictions.

3. The computer-implemented method of clauses 1 or 2, wherein the set of predictions comprises a set of scores for the set of region proposals, wherein each score included in the set of scores represents a probability that a corresponding region proposal includes text associated with a corresponding key.

4. The computer-implemented method of any of clauses 1-3, wherein determining the first set of bounding boxes and the second set of bounding boxes based on the set of predictions comprises assigning a region proposal with a score that meets a threshold to the corresponding key.

5. The computer-implemented method of any of clauses 1-4, wherein determining the first set of bounding boxes and the second set of bounding boxes further comprises applying a second machine learning model to a second set of features for the document to generate the set of region proposals.

6. The computer-implemented method of any of clauses 1-5, further comprising generating a third set of mappings between the first set of bounding boxes and a third set of bounding boxes for a third set of values associated with a third key within the document based on the first set of locations and a third set of locations of the third set of bounding boxes, and determining, for the given item included in the list of items, one or more additional associated bounding boxes included in the third set of bounding boxes based on the third set of mappings.

7. The computer-implemented method of any of clauses 1-6, wherein generating the first set of mappings comprises assigning each bounding box included in the first set of bounding boxes to a different item in the list of items.

8. The computer-implemented method of any of clauses 1-7, wherein generating the second set of mappings comprises maximizing an overall row-based alignment between the first set of bounding boxes and the second set of bounding boxes.

9. The computer-implemented method of any of clauses 1-8, wherein generating the second set of mappings comprises removing a mapping between a first bounding box included in the first set of bounding boxes and a second bounding box included in the second set of bounding boxes when a distance between a first location of the first bounding box and a second location of the second bounding box exceeds a threshold.

10. The computer-implemented method of any of clauses 1-9, wherein generating the second set of mappings comprises generating a first mapping between a first bounding box included in the first set of bounding boxes and a second bounding box included in the second set of bounding boxes when the first bounding box and the second bounding box span the same y-coordinates.

11. In some embodiments, one or more non-transitory computer readable media store instructions that, when executed by one or more processors, cause the one or more processors to perform the steps of determining, via execution of one or more machine learning models, a first set of bounding boxes for a first set of values associated with a first key within a document and a second set of bounding boxes for a second set of values associated with a second key within the document, generating a first set of mappings between a list of items included in the document and the first set of bounding boxes, generating a second set of mappings between the first set of bounding boxes and the second set of bounding boxes based on a first set of locations of the first set of bounding boxes and a second set of locations of the second set of bounding boxes, and determining, for a given item included in the list of items, one or more associated bounding boxes included in the first set of bounding boxes and the second set of bounding boxes based on the first set of mappings and the second set of mappings.

12. The one or more non-transitory computer readable media of clause 11, wherein determining the first set of bounding boxes and the second set of bounding boxes comprises applying a first machine learning model to a set of region proposals that bound one or more portions of text within the document to generate a set of predictions associated with one or more key-value pairs included in the document, and determining the first set of bounding boxes and the second set of bounding boxes based on the set of predictions.

13. The one or more non-transitory computer readable media of clauses 11 or 12, wherein the set of predictions comprises a set of scores for the set of region proposals, wherein each score included in the set of scores represents a probability that a corresponding region proposal includes text associated with a corresponding key.

14. The one or more non-transitory computer readable media of any of clauses 11-13, wherein determining the first set of bounding boxes and the second set of bounding boxes based on the set of predictions comprises assigning a region proposal with a score that meets a threshold to the corresponding key.

15. The one or more non-transitory computer readable media of any of clauses 11-14, wherein determining the first set of bounding boxes and the second set of bounding boxes further comprises applying a second machine learning model to a second set of features for the document to generate the set of region proposals.

16. The one or more non-transitory computer readable media of any of clauses 11-15, wherein determining, for the given item, the one or more associated bounding boxes comprises associating a first bounding box mapped to an item and a second bounding box mapped to the first bounding box with the item.

17. The one or more non-transitory computer readable media of any of clauses 11-16, wherein generating the first set of mappings comprises generating a one-to-one mapping between each bounding box included in the first set of bounding boxes and an identifier for a corresponding item included in the list of items.

18. The one or more non-transitory computer readable media of any of clauses 11-17, wherein generating the second set of mappings comprises generating a first mapping between a first bounding box included in the first set of bounding boxes and a second bounding box included in the second set of bounding boxes based on a row-based alignment between the first bounding box and the second bounding box.

19. The one or more non-transitory computer readable media of any of clauses 11-18, wherein generating the second set of mappings further comprises generating a second mapping between the second bounding box and a third bounding box included in the second set of bounding boxes based on a distance between the second bounding box and the third bounding box.

20. In some embodiments, a system comprises a memory that stores instructions, and a processor that is coupled to the memory and, when executing the instructions, is configured to determine, via execution of one or more machine learning models, a first set of bounding boxes for a first set of values associated with a first key within a document and a second set of bounding boxes for a second set of values associated with a second key within the document, generate a first set of mappings between a list of items included in the document and the first set of bounding boxes, generate a second set of mappings between the first set of bounding boxes and the second set of bounding boxes based on a first set of locations of the first set of bounding boxes and a second set of locations of the second set of bounding boxes, and determine, for a given item included in the list of items, one or more associated bounding boxes included in the first set of bounding boxes and the second set of bounding boxes based on the first set of mappings and the second set of mappings.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for extracting data from a document, the method comprising:
generating, by processing a digital representation of a document including one or more regions of text, a set of feature maps that represent the one or more regions of text;
resizing the set of feature maps based on sizes corresponding to the one or more regions of text;
extracting one or more key-value pairs from the one or more regions of text based on the resized set of feature maps;
generating, via execution of one or more machine learning models, a first set of bounding boxes for a first set of values associated with a first key within the one or more key-value pairs and a second set of bounding boxes for a second set of values associated with a second key within the one or more key-value pairs;

generating a first set of mappings between a list of items included in the document and the first set of bounding boxes;

generating a second set of mappings between the first set of bounding boxes and the second set of bounding boxes based on maximizing one or more of vertical column alignment or horizontal row alignment parameters between a first set of locations of the first set of bounding boxes and a second set of locations of the second set of bounding boxes, wherein the first set of locations and the second set of locations are non-overlapping;

determining, for a given item included in the list of items, one or more associated bounding boxes included in the first set of bounding boxes and the second set of bounding boxes based on the first set of mappings and the second set of mappings; and extracting, for each given item included in the list of items, corresponding text included in the document based on the one or more associated bounding boxes.

2. The computer-implemented method of claim 1, wherein determining the first set of bounding boxes and the second set of bounding boxes comprises:

applying a first machine learning model to a set of region proposals that bound the one or more regions of text within the document to generate a set of predictions associated with the one or more key-value pairs included in the document; and determining the first set of bounding boxes and the second set of bounding boxes based on the set of predictions.

3. The computer-implemented method of claim 2, wherein the set of predictions comprises a set of scores for the set of region proposals, wherein each score included in the set of scores represents a probability that a corresponding region proposal includes text associated with a corresponding key.

4. The computer-implemented method of claim 3, wherein determining the first set of bounding boxes and the second set of bounding boxes based on the set of predictions comprises assigning a region proposal with a score that meets a threshold to the corresponding key.

5. The computer-implemented method of claim 2, wherein determining the first set of bounding boxes and the second set of bounding boxes further comprises applying a second machine learning model to a second set of features for the document to generate the set of region proposals.

6. The computer-implemented method of claim 1, further comprising:

generating a third set of mappings between the first set of bounding boxes and a third set of bounding boxes for a third set of values associated with a third key within the one or more key-value pairs based on the first set of locations and a third set of locations of the third set of bounding boxes; and determining, for the given item included in the list of items, one or more additional associated bounding boxes included in the third set of bounding boxes based on the third set of mappings.

7. The computer-implemented method of claim 1, wherein generating the first set of mappings comprises assigning each bounding box included in the first set of bounding boxes to a different item in the list of items.

8. The computer-implemented method of claim 1, wherein generating the second set of mappings comprises maximizing an overall row-based alignment between the first set of bounding boxes and the second set of bounding boxes.

9. The computer-implemented method of claim 1, wherein generating the second set of mappings comprises removing a mapping between a first bounding box included in the first set of bounding boxes and a second bounding box included in the second set of bounding boxes when a distance between a first location of the first bounding box and a second location of the second bounding box exceeds a threshold.

10. The computer-implemented method of claim 1, wherein generating the second set of mappings comprises generating a first mapping between a first bounding box included in the first set of bounding boxes and a second bounding box included in the second set of bounding boxes when the first bounding box and the second bounding box span the same y-coordinates.

11. One or more non-transitory computer readable media storing instructions that, when executed by one or more processors, cause the one or more processors to perform the steps of:

generating, by processing a digital representation of a document including one or more regions of text, a set of feature maps that represent the one or more regions of text;

resizing the set of feature maps based on sizes corresponding to the one or more regions of text;

extracting one or more key-value pairs from the one or more regions of text based on the resized set of feature maps;

generating, via execution of one or more machine learning models, a first set of bounding boxes for a first set of values associated with a first key within the one or more key-value pairs and a second set of bounding boxes for a second set of values associated with a second key within the one or more key-value pairs;

generating a first set of mappings between a list of items included in the document and the first set of bounding boxes;

generating a second set of mappings between the first set of bounding boxes and the second set of bounding boxes based on maximizing one or more of vertical column alignment or horizontal row alignment parameters between a first set of locations of the first set of bounding boxes and a second set of locations of the second set of bounding boxes, wherein the first set of locations and the second set of locations are non-overlapping;

determining, for a given item included in the list of items, one or more associated bounding boxes included in the first set of bounding boxes and the second set of bounding boxes based on the first set of mappings and the second set of mappings; and extracting, for each given item included in the list of items, corresponding text included in the document based on the one or more associated bounding boxes.

12. The one or more non-transitory computer readable media of claim 11, wherein determining the first set of bounding boxes and the second set of bounding boxes comprises:

applying a first machine learning model to a set of region proposals that bound the one or more regions of text within the document to generate a set of predictions associated with the one or more key-value pairs included in the document; and determining the first set of bounding boxes and the second set of bounding boxes based on the set of predictions.

13. The one or more non-transitory computer readable media of claim 12, wherein the set of predictions comprises a set of scores for the set of region proposals, wherein each score included in the set of scores represents a probability that a corresponding region proposal includes text associated with a corresponding key.

14. The one or more non-transitory computer readable media of claim 13, wherein determining the first set of bounding boxes and the second set of bounding boxes based on the set of predictions comprises assigning a region proposal with a score that meets a threshold to the corresponding key.

15. The one or more non-transitory computer readable media of claim 12, wherein determining the first set of bounding boxes and the second set of bounding boxes further comprises applying a second machine learning model to a second set of features for the document to generate the set of region proposals.

16. The one or more non-transitory computer readable media of claim 11, wherein determining, for the given item, the one or more associated bounding boxes comprises associating a first bounding box mapped to an item and a second bounding box mapped to the first bounding box with the item.

17. The one or more non-transitory computer readable media of claim 11, wherein generating the first set of mappings comprises generating a one-to-one mapping between each bounding box included in the first set of bounding boxes and an identifier for a corresponding item included in the list of items.

18. The one or more non-transitory computer readable media of claim 11, wherein generating the second set of mappings comprises generating a first mapping between a first bounding box included in the first set of bounding boxes and a second bounding box included in the second set of bounding boxes based on a row-based alignment between the first bounding box and the second bounding box.

19. The one or more non-transitory computer readable media of claim 18, wherein generating the second set of mappings further comprises generating a second mapping between the second bounding box and a third bounding box included in the second set of bounding boxes based on a distance between the second bounding box and the third bounding box.

20. A system, comprising:
a memory that stores instructions, and
a processor that is coupled to the memory and, when executing the instructions, is configured to:
   generate, by processing a digital representation of a document including one or more regions of text, a set of feature maps that represent the one or more regions of text;
   resize the set of feature maps based on sizes corresponding to the one or more regions of text;
   extract one or more key-value pairs from the one or more regions of text based on the resized set of feature maps;
   generate, via execution of one or more machine learning models, a first set of bounding boxes for a first set of values associated with a first key within the one or more key-value pairs and a second set of bounding boxes for a second set of values associated with a second key within the one or more key-value pairs;
   generate a first set of mappings between a list of items included in the document and the first set of bounding boxes;
   generate a second set of mappings between the first set of bounding boxes and the second set of bounding boxes based on maximizing one or more of vertical column alignment or horizontal row alignment parameters between a first set of locations of the first set of bounding boxes and a second set of locations of the second set of bounding boxes, wherein the first set of locations and the second set of locations are non-overlapping;
   determine, for a given item included in the list of items, one or more associated bounding boxes included in the first set of bounding boxes and the second set of bounding boxes based on the first set of mappings and the second set of mappings; and
   extract, for each given item included in the list of items, corresponding text included in the document based on the one or more associated bounding boxes.

* * * * *